United States Patent
Oh et al.

(10) Patent No.: US 11,609,654 B2
(45) Date of Patent: Mar. 21, 2023

(54) ELECTRONIC DEVICE AND INTERFACE DEVICE HAVING SENSOR LAYER CAPABLE OF OPERATING IN TWO MODES

(71) Applicant: SAMSUNG DISPLAY CO., LTD., Yongin-si (KR)

(72) Inventors: Yerin Oh, Ulsan (KR); Soowon Kim, Cheonan-si (KR); Jaseung Ku, Yongin-si (KR); Jisu Yeom, Asan-si (KR); Suhyun Jeong, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/378,768

(22) Filed: Jul. 19, 2021

(65) Prior Publication Data
US 2022/0100340 A1     Mar. 31, 2022

(30) Foreign Application Priority Data

Sep. 28, 2020   (KR) .................. 10-2020-0126052

(51) Int. Cl.
| | | |
|---|---|---|
| *G06F 3/041* | (2006.01) | |
| *G09G 3/32* | (2016.01) | |
| *G06F 3/0354* | (2013.01) | |
| *G06F 3/044* | (2006.01) | |

(52) U.S. Cl.
CPC ........ *G06F 3/04162* (2019.05); *G06F 3/0412* (2013.01); *G06F 3/04166* (2019.05); *G09G 3/32* (2013.01); *G06F 3/03545* (2013.01); *G06F 3/0446* (2019.05); *G06F 2203/04102* (2013.01); *G09G 2310/0243* (2013.01); *G09G 2320/0247* (2013.01)

(58) Field of Classification Search
CPC ............ G06F 3/04162; G06F 3/04166; G06F 3/0412; G06F 3/0446; G06F 3/03545; G06F 2203/04102; G09G 3/32
See application file for complete search history.

(56) References Cited

U.S. PATENT DOCUMENTS

| | | |
|---|---|---|
| 9,332,569 B2 | 5/2016 | Rudolph et al. |
| 10,606,389 B2 | 3/2020 | Ju et al. |
| 10,795,483 B2 | 10/2020 | Hwang et al. |

(Continued)

FOREIGN PATENT DOCUMENTS

| | | |
|---|---|---|
| KR | 10-0684153 | 2/2007 |
| KR | 10-2019-0003148 | 1/2019 |
| KR | 10-2020-0009800 | 1/2020 |

*Primary Examiner* — Lisa S Landis
(74) *Attorney, Agent, or Firm* — H.C. Park & Associates, PLC

(57) ABSTRACT

An interface device includes an electronic device and an input device for communicating with the electronic device, wherein the electronic device includes a display layer, a sensor layer which is disposed on the display layer and senses a first input by the input device, a display driving unit for generating a vertical synchronization signal for driving the display layer, and a control unit for controlling the sensor layer, wherein the control unit outputs, in synchronization with a first vertical synchronization signal, a first uplink signal to the sensor layer and outputs, in synchronization with a second vertical synchronization signal, a second uplink signal having a phase different from a phase of the first uplink signal to the sensor layer.

18 Claims, 15 Drawing Sheets

(56) References Cited

U.S. PATENT DOCUMENTS

| | | |
|---|---|---|
| 2018/0232070 A1 | 8/2018 | Katsurahira |
| 2020/0004367 A1* | 1/2020 | Lee ..................... G06F 3/03545 |
| 2021/0191590 A1* | 6/2021 | Jang ................... G06F 3/04162 |
| 2021/0200356 A1* | 7/2021 | Chung ............. G06F 3/041661 |

* cited by examiner

ELECTRONIC DEVICE AND INTERFACE DEVICE HAVING SENSOR LAYER CAPABLE OF OPERATING IN TWO MODES

CROSS-REFERENCE TO RELATED APPLICATION

This application claims priority from and the benefit of Korean Patent Application No. 10-2020-0126052, filed on Sep. 28, 2020, which is hereby incorporated by reference for all purposes as if fully set forth herein.

BACKGROUND

Field

Embodiments/implementations of the invention relate generally to an electronic device with improved image quality and an interface device including the same.

Discussion of the Background

An electronic device may detect an external input applied from outside of the electronic device. The external input may be a user's input. The user's input may include various types of external inputs such as a part of a user's body, light, heat, a pen, and pressure. In cases in which the external input is via a pen, the electronic device may determine the coordinates of the pen by using an electromagnetic resonance (EMR) method or an active electrostatic (AES) method.

The above information disclosed in this Background section is only for understanding of the background of the inventive concepts, and, therefore, it may contain information that does not constitute prior art.

SUMMARY

Devices constructed/methods according to implementations/embodiments of the invention are capable of reducing or eliminating any flickering caused by signals colliding with each other by generating uplink signals of different phases from each other that act to cancel out any flickering from occurring on a display of an electronic device. This is accomplished by generating an optical illusion effect in which a first flicker, generated by a data signal and first noise from a first uplink signal during a first time frame, and a second flicker, generated by noise from a second uplink signal during a second time frame that occurs after the first time frame, effectively cancel out each other out, thereby improving an image quality on the display of the electronic device by greatly reducing or removing flickering from occurring on the display.

As such, the present disclosure provides an electronic device with improved image quality and an interface device including the same.

An embodiment of the inventive concepts provides an electronic device including: a display layer configured to display an image for a plurality of frame periods; a sensor layer disposed on the display layer and configured to operate in a first mode in which a first input by an input device is sensed and in a second mode in which a second input by a touch is sensed; and a control unit configured to control the sensor layer, wherein the control unit outputs, to the sensor layer during a first frame period of the plurality of frame periods, a first uplink signal in the first mode and outputs, to the sensor layer during a second frame period of the plurality of frame periods different from the first frame period, a second uplink signal having a phase different from a phase of the first uplink in the first mode.

In an embodiment, the first uplink signal and the second uplink signal may respectively include synchronization data different from each other.

In an embodiment, the first mode and the second mode may each be respectively provided as a plurality of first and second modes and may be repeated with each other, and the control unit may output the first uplink signal to the sensor layer in a (2n−1)-th first mode (n is a positive integer) and may output the second uplink signal to the sensor layer in a 2n-th first mode.

In an embodiment, the first uplink signal and the second uplink signal may each be respectively provided as a plurality of first and second uplink signals, and an output timing of a first uplink signal in an (n+2)-th frame period (n is a positive integer) may be delayed by a first time when compared with an output timing of a first uplink signal in an n-th frame period.

In an embodiment, an output timing of a second uplink signal in an (n+3)-th frame period may be delayed by a second time when compared with an output timing of a second uplink signal in an (n+1)-th frame period.

In an embodiment, the first uplink signal and the second uplink signal may each be respectively provided as a plurality of first and second uplink signals, and the control unit is may continually output the first uplink signals to the sensor layer for m number of frame periods (m is an integer greater than 1), respectively, and may continually output the second uplink signals to the sensor layer for k number of frame periods (k is an integer greater than 1), respectively.

In an embodiment, an output timing of a first uplink signal in an (n+1)-th frame period (n is a positive integer) may be delayed by a first time when compared with an output timing of a first uplink signal in an n-th frame period, and an output timing of a second uplink signal in an (i+1)-th frame period (i is a positive integer) may be delayed by a second time when compared with an output timing of a second uplink signal in an i-th frame period.

In an embodiment, a first period of the plurality of frame periods may be different from a second period of the first uplink signal.

In an embodiment, the control unit may sequentially operate in the first mode and the second mode while an image of one frame period is displayed on the display layer.

In an embodiment, the first mode may include a first time period in which the first uplink signal or the second uplink signal is transmitted to the input device and a second time period in which the first input is sensed from a downlink signal provided from the input device, wherein the second time period occurs after the first time period.

In an embodiment, the electronic device may further include a display driving unit configured to generate a vertical synchronization signal for driving the display layer, wherein the control unit outputs, in synchronization with the vertical synchronization signal, the first uplink signal or the second uplink signal to the sensor layer.

In an embodiment of the inventive concepts, an interface device includes an electronic device and an input device configured to communicate with the electronic device, wherein the electronic device includes: a display layer; a sensor layer disposed on the display layer and configured to sense a first input by the input device; a display driving unit configured to generate a vertical synchronization signal for driving the display layer; and a control unit configured to control the sensor layer, wherein the control unit outputs, in synchronization with a first synchronization signal, a first uplink signal to the sensor layer and outputs, in synchronization with a second synchronization signal, a second uplink signal having a phase different from a phase of the first uplink signal to the sensor layer.

In an embodiment, the first uplink signal may include first synchronization data, the second uplink signal may include second synchronization data, and the input device may distinguish between the first uplink signal and the second uplink signal on the basis of the first synchronization data and the second synchronization data.

In an embodiment, the input device may receive the first uplink signal and the second uplink signal, may output a first downlink signal on the basis of the first uplink signal, and may output a second downlink signal on the basis of the second uplink signal.

In an embodiment, the input device may receive the first uplink signal and the second uplink signal and may output a downlink signal on the basis of only the first uplink signal.

In an embodiment, the synchronization signal is a vertical synchronization signal, wherein the vertical synchronization signal may be respectively provided as a plurality of vertical synchronization signals, and the control unit may output, in synchronization with a (2n−1)-th vertical synchronization signal (n is a positive integer), the first uplink signal to the sensor layer and may output, in synchronization with a 2n-th vertical synchronization signal, the second uplink signal to the sensor layer.

In an embodiment, the first uplink signal, the second uplink signal, and the vertical synchronization signal may each be respectively provided as a plurality of first uplink signals, a plurality of second uplink signals, and a plurality of vertical synchronization signals, and an output timing of a first uplink signal outputted to the sensor layer in synchronization with an (n+2)-th vertical synchronization signal (n is a positive integer) may be delayed by a first time when compared with an output timing of a first uplink signal outputted to the sensor layer in synchronization with an n-th vertical synchronization signal.

In an embodiment, an output timing of a second uplink signal outputted to the sensor layer in synchronization with an (n+3)-th vertical synchronization signal may be delayed by a second time when compared with an output timing of a second uplink signal outputted to the sensor layer in synchronization with an (n+1)-th vertical synchronization signal.

In an embodiment, the first uplink signal, the second uplink signal, and the vertical synchronization signal may each be respectively provided as a plurality of first uplink signals, a plurality of second uplink signals, and a plurality of vertical synchronization signals, and the control unit may continually output the first uplink signals to the sensor layer for m number of frame periods (m is an integer greater than 1), respectively, and may continually output the second uplink signals to the sensor layer fork number of frame periods (k is an integer greater than 1), respectively.

In an embodiment, an output timing of a first uplink signal outputted to the sensor layer in synchronization with an (n+1)-th vertical synchronization signal (n is a positive integer) may be delayed by a first time when compared with an output timing of a first uplink signal outputted to the sensor layer in synchronization with an n-th vertical synchronization signal, and an output timing of a second uplink signal outputted to the sensor layer in synchronization with an (i+1)-th vertical synchronization signal (i is a positive integer) may be delayed by a second time when compared with an output timing of a second uplink signal outputted to the sensor layer in synchronization with an i-th vertical synchronization signal.

Additional features of the inventive concepts will be set forth in the description which follows, and in part will be apparent from the description, or may be learned by practice of the inventive concepts.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

DETAILED DESCRIPTION

Figure 1A:
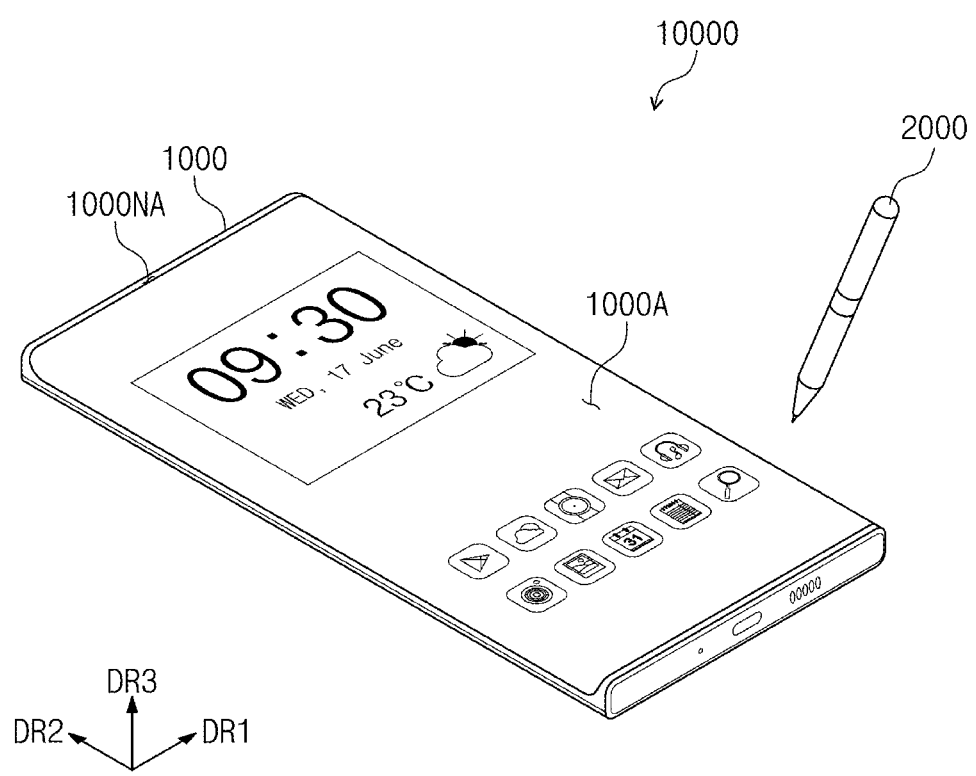
FIG. 1A is a perspective view illustrating an interface device according to an embodiment constructed according to principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As is used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "haves," "having," "includes," and/or "including," when used in this specification, specify the presence of stated features, integers, steps, operations, elements, components, and/or groups thereof, but do not preclude the is presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, the present invention will be explained in detail with reference to the accompanying drawings.

FIG. 1A is a perspective view illustrating an interface device according to an embodiment constructed according to principles of the invention.

Referring to FIG. 1A, an interface device 10000 may include an electronic device 1000 and an input device 2000. The electronic device 1000 may detect a first input by the input device 2000. The interface device 10000 may also be referred to as a digitizer.

The electronic device 1000 may be a device that is activated according to an electrical signal. For example, the electronic device 1000 may be a mobile phone, a tablet, a car navigation device, a game machine, or a wearable device but is not limited thereto. FIG. 1A exemplarily illustrates the electronic device 1000 as a mobile phone.

An active area 1000A and a peripheral area 1000NA may be defined in the electronic device 1000. The electronic device 1000 may display an image through the active area 1000A. The active area 1000A may include a surface defined by a first direction DR1 and a second direction DR2 orthogonal to the first direction (i.e., x and y axes of an x-y-z coordinate system). The peripheral area 1000NA may surround the active area 1000A.

A thickness direction of the electronic device 1000 may be parallel to a third direction DR3 orthogonal to both the first direction DR1 and the second direction DR2 (i.e., third direction DR3 corresponds to a z axis of an x-y-z coordinate system). Accordingly, a front surface (or a top surface) and a rear surface (or a bottom surface) of each of members constituting the electronic device 1000 may be defined on the basis of the third direction DR3.

The electronic device 1000 may detect external inputs applied from outside of the electronic device 1000. The external inputs may include various types of external inputs such as a part of a user's body, light, heat, and pressure. Each of the external inputs may be referred to as a second input.

The electronic device 1000 illustrated in FIG. 1A may detect an input by a user's touch and an input by the input device 2000. The input device 2000 may refer to a device other than a user's body. The input by the input device 2000 may be referred to as the first input. For example, the input device 2000 may be an active pen, a stylus pen, a touch pen, or an electronic pen. Hereinafter, the input device 2000 will be described as, as an example, an active pen.

The electronic device 1000 and the input device 2000 may perform two-way communication with each other. The electronic device 1000 may provide an uplink signal to the is input device 2000. For example, the uplink signal may include synchronization data or information about the electronic device 1000 but is not particularly limited thereto. The input device 2000 may provide a downlink signal to the electronic device 1000. The downlink signal may include a synchronization signal or state information of the input device 2000. For example, the downlink signal may include coordinate information of the input device 2000, battery information of the input device 2000, tilt information of the input device 2000, and/or various pieces of information stored in the input device 2000, but the downlink signal is not particularly limited thereto. The uplink signal and the downlink signal may each respectively be provided as a plurality uplink signals and a plurality of downlink signals. The uplink signal and the downlink signal will be described later.

Figure 1B:
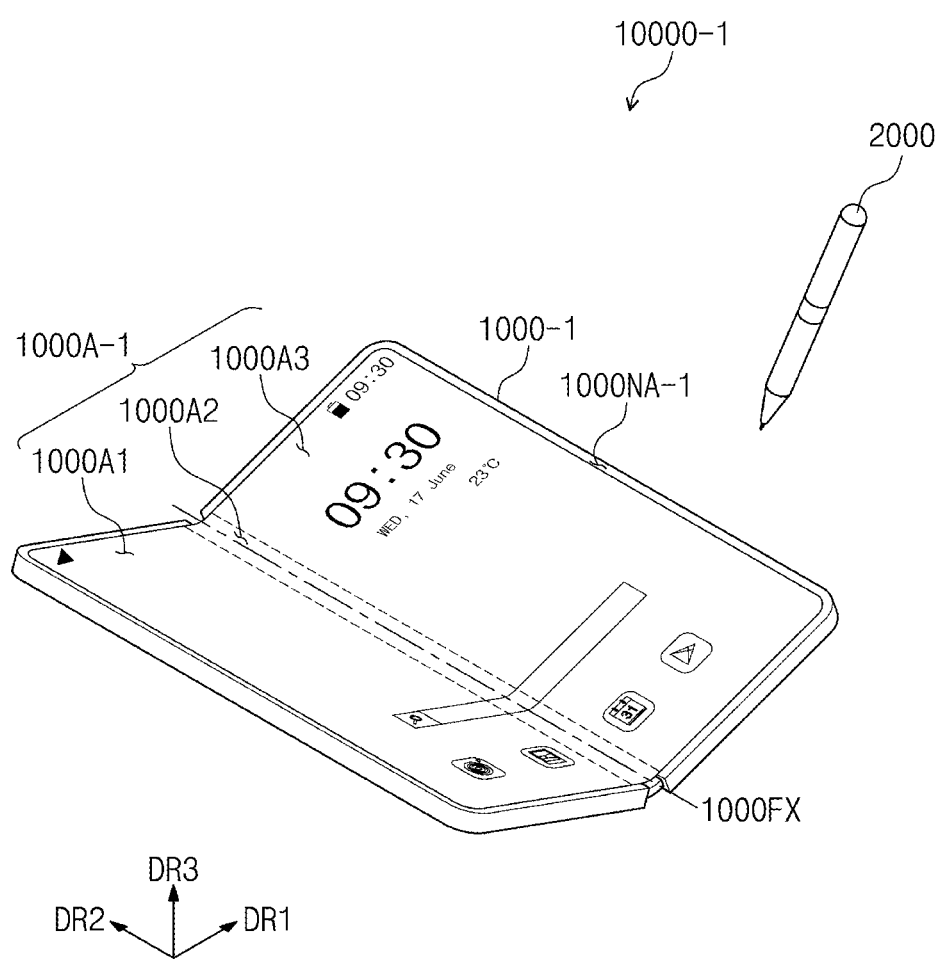
FIG. 1B is a perspective view illustrating an interface device according to an embodiment.

FIG. 1B is a perspective view illustrating an interface device according to an embodiment. When a description is given about FIG. 1B, a component described with reference to FIG. 1A is denoted by the same reference numeral, and a description thereof will not be given for ease in explanation of this embodiment.

Referring to FIG. 1B, an interface device 10000-1 may include an electronic device 1000-1 and an input device 2000. FIG. 1B illustrates a state in which the electronic device 1000-1 is folded at a predetermined angle. When the electronic device 1000-1 is unfolded, an active area 1000A-1 may include a plane defined by a first direction DR1 and a second direction DR2 orthogonal to the first direction.

The active area 1000A-1 may include a first area 1000A1, a second area 1000A2, and a third area 1000A3. The first area 1000A1, the second area 1000A2, and the third area 1000A3 may be sequentially defined in the first direction DR1. The second area 1000A2 may be bent about a folding axis 1000FX extending in the second direction DR2. Accordingly, the first is area 1000A1 and the third area 1000A3 may be referred to as non-folding areas, and the second area 1000A2 may be referred to as a folding area.

When the electronic device 1000-1 is folded, the first area 1000A1 and the third area 1000A3 may face each other. Accordingly, in a fully folded state, the active area 1000A-1 may not be exposed to the outside, which may be referred to as in-folding. However, this is illustrative, and an operation of the electronic device 1000-1 is not limited thereto.

For example, when the electronic device 1000-1 according an embodiment is folded, the first area 1000A1 and the third area 1000A3 may be opposing each other. Accordingly, in a folded state, the active area 1000A-1 may be exposed to the outside, which may be referred to as out-folding.

The electronic device 1000-1 may perform only one of in-folding and out-folding operations. Alternatively, the electronic device 1000-1 may perform both the in-folding and out-folding operations. In this case, the same area of the electronic device 1000-1, for example, the second area 1000A2 may be in-folded and out-folded.

Although one folding area and two non-folding areas are illustrated as an example in FIG. 1B, the number of each of folding areas and non-folding areas is not limited thereto. For example, the electronic device 1000-1 may include more than two non-folding areas and a plurality of folding areas respectively disposed between adjacent non-folding areas.

Although FIG. 1B exemplarily illustrates the folding axis 1000FX as extending in the second direction DR2, the embodiment is not limited thereto. For example, the folding axis 1000FX may extend in a direction parallel to the first direction DR1. In this case, the first area 1000A1, the second area 1000A2, and the third area 1000A3 may be sequentially arranged in the second direction DR2.

The electronic device 1000-1 and the input device 2000 may perform two-way communication with each other. The electronic device 1000-1 may provide each of uplink signals to the input device 2000. The input device 2000 may provide each of downlink signals to the electronic device 1000-1. The electronic device 1000-1 may detect coordinates or a tilt of the input device 2000 by using the signal provided from the input device 2000.

Figure 2:
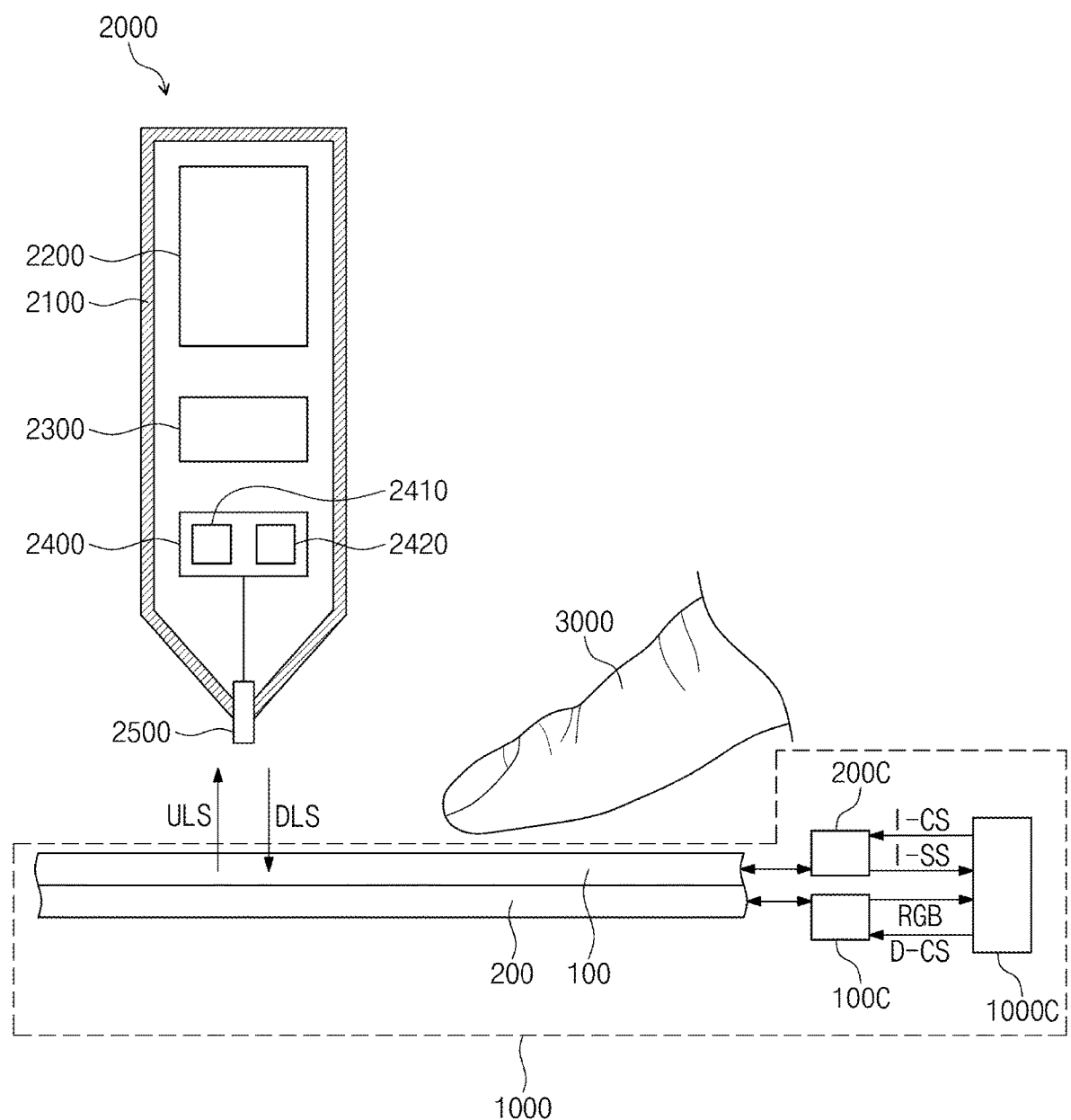
FIG. 2 is a block diagram schematically illustrating an electronic device and an input device according to an embodiment.

FIG. 2 is a block diagram schematically illustrating an electronic device and an input device according to an embodiment.

Referring to FIG. 2, the electronic device 1000 may include a display layer 100, a sensor layer 200, a display driving unit 100C, a control unit 200C, and a main control unit 1000C.

The display layer 100 may be a component that substantially generates an image. The display layer 100 may be a light emitting display layer and may be, for example, an organic light emitting display layer, a quantum dot display layer, a micro LED display layer, or a nano LED display layer.

The sensor layer 200 may be disposed on the display layer 100. The sensor layer 200 may sense an external input applied from the outside. The sensor layer 200 may sense the first input by the input device 2000 and the second input by a user's body 3000.

The main control unit 1000C may control an overall operation of the electronic device 1000. For example, the main control unit 1000C may control operations of the display driving unit 100C and the control unit 200C. The main control unit 1000C may include at least one microprocessor and may be referred to as a host.

The display driving unit 100C may control the display layer 100. The main control unit 1000C may further include a graphic controller. The display driving unit 100C may is receive image data RGB and a control signal D-CS from the main control unit 1000C. The control signal D-CS may include various signals. For example, the control signal D-CS may include an input vertical synchronization signal, an input horizontal synchronization signal, a main clock, a data enable signal, and the like. On the basis of the control signal D-CS, the display driving unit 100C may generate a vertical synchronization signal and a horizontal synchronization signal for controlling timing of providing a signal to the display layer 100.

The control unit 200C may control the sensor layer 200. The control unit 200C may receive a control signal I-CS from the main control unit 1000C. The control signal I-CS may include a mode determination signal for determining a driving mode of the control unit 200C and a clock signal. The control unit 200C may operate, on the basis of the control signal I-CS, in a first mode in which the first input by the input device 2000 is detected or in a second mode in which the second input by the user's body 3000 is detected. On the basis of the mode determination signal, the control unit 200C may perform control so that the sensor layer 200 operates in the first mode or the second mode.

The control unit 200C may calculate coordinate information of the first input or the second input on the basis of a signal received from the sensor layer 200 and may provide the main control unit 1000C with a coordinate signal I-SS having the coordinate information. The main control unit 1000C may allow an operation corresponding to a user's input to be executed on the basis of the coordinate signal I-SS. For example, the main control unit 1000C may operate the display driving unit 100C so that a new application image is displayed on the display layer 100 on the basis of the coordinate signal I-SS.

The input device 2000 may include a housing 2100, a power supply 2200, a controller 2300, a communication module 2400, and a pen electrode 2500. However, components constituting the input device 2000 are not limited to the components listed above. For example, the input device 2000 may further include an electrode switch for switching between a signal transmission mode and a signal reception mode, a pressure sensor for sensing pressure, memory for storing predetermined information, a rotation sensor for sensing rotation, or the like.

The housing 2100 may have a pen shape, and an accommodation space may be formed thereinside. The power supply 2200, the controller 2300, the communication module 2400, and the pen electrode 2500 may be accommodated in the accommodation space defined inside the housing 2100.

The power supply 2200 may supply power to the controller 2300, the communication module 2400, and the like inside the input device 2000. The power supply 2200 may include a battery or a high-capacity capacitor.

The controller 2300 may control an operation of the input device 2000. The controller 2300 may be an application-specific integrated circuit (ASIC). The controller 2300 may be configured to operate according to a designed program.

The communication module 2400 may include a transmitting circuit 2410 and a receiving circuit 2420. The transmitting circuit 2410 may output each of downlink signals DLS to the sensor layer 200. The receiving circuit 2420 may receive each of uplink signals ULS provided from the sensor layer 200. The uplink signal ULS may have a frequency of about 500 kHz (kilohertz). The uplink signal ULS may include a first uplink signal ULS1 (see FIG. 9) and a second uplink signal ULS2 (see FIG. 9). The first uplink signal ULS1 (see FIG. 9) and the second uplink signal ULS2 (see FIG. 9) may each respectively be provided as a plurality of first uplink signals and a plurality of second uplink signals. The first uplink signal ULS1 (see FIG. 9) is and the second uplink signal ULS2 (see FIG. 9) will be described later. The transmitting circuit 2410 may receive a signal provided from the controller 2300 and modulate the signal into a signal that the sensor layer 200 may sense, and the receiving circuit 2420 may modulate a signal provided from the sensor layer 200 into a signal that the controller 2300 may process.

The pen electrode 2500 may be electrically connected to the communication module 2400. A portion of the pen electrode 2500 may protrude from the housing 2100. In addition, the input device 2000 may further include a cover housing for covering the pen electrode 2500 exposed from the housing 2100. Alternatively, the pen electrode 2500 may be embedded inside the housing 2100.

Figure 3A:
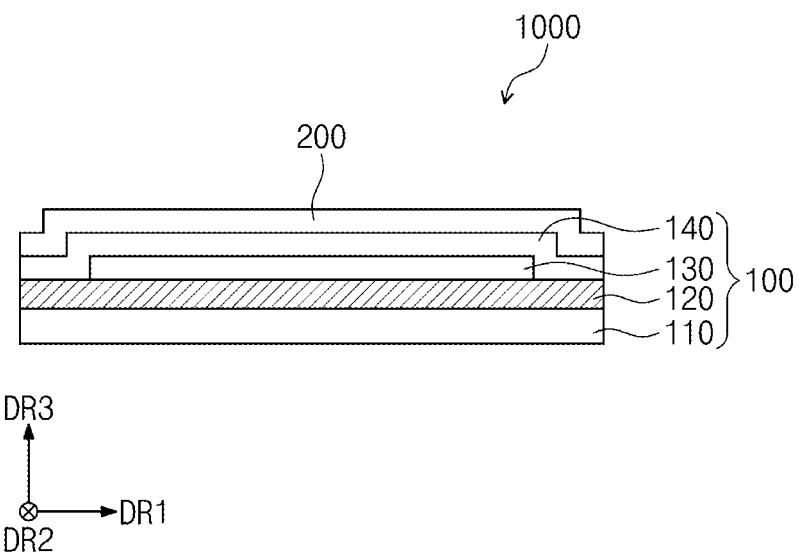
FIG. 3A is a cross-sectional view of an electronic device according to an embodiment.

FIG. 3A is a cross-sectional view of an electronic device according to an embodiment.

Referring to FIG. 3A, the electronic device 1000 may include the display layer 100 and the sensor layer 200. The display layer 100 may include a base layer 110, a circuit layer 120, a light emitting element layer 130, and an encapsulation layer 140.

The base layer 110 may be a member for providing a base surface on which the circuit layer 120 is disposed. The base layer 110 may be a glass substrate, a metal substrate, or a polymer substrate. However, an embodiment is not limited thereto, and the base layer 110 may be an inorganic layer, an organic layer, or a composite material layer.

The base layer 110 may have a multilayer structure. For example, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a base barrier layer.

Each of the first and second synthetic resin layers may include polyimide-based resin. In addition, each of the first and second synthetic resin layers may include at least one of acrylate-based resin, methacrylate-based resin, polyisoprene-based resin, vinyl-based resin, epoxy-based resin, urethane-based resin, cellulose-based resin, siloxane-based resin, polyamide-based resin, or perylene-based resin. In this specification, meanwhile, "~~"-based resin denotes that the resin includes a functional group of "~~".

The circuit layer 120 may be disposed on the base layer 110. The circuit layer 120 may include an insulating layer, a semiconductor pattern, a conductive pattern, a signal line, and the like. The insulating layer, a semiconductor layer, and a conductive layer may be formed on the base layer 110 in a method such as coating and deposition, and thereafter, the insulating layer, the semiconductor layer, and the conductive layer may be selectively patterned through a plurality of photolithography processes. Thereafter, the semiconductor pattern, the conductive pattern, and the signal line included in the circuit layer 120 may be formed.

The light emitting element layer 130 may be disposed on the circuit layer 120. The light emitting element layer 130 may include a light emitting element. For example, the light emitting element layer 130 may include an organic light emitting material, a quantum dot, a quantum rod, a micro LED, or a nano LED.

The encapsulation layer 140 may be disposed on the light emitting element layer 130. The encapsulation layer 140 may protect the light emitting element layer 130 from foreign matter such as moisture, oxygen, and dust particles.

The sensor layer 200 may be formed on the display layer 100 through a continuous process. In this case, the sensor layer 200 may be said to be directly disposed on the display layer 100. The expression "directly disposed" may mean that a third component is not disposed between the sensor layer 200 and the display layer 100. That is, a separate adhesive member may not be disposed between the sensor layer 200 and the display layer 100. Alternatively, the sensor layer 200 may be bonded to the display layer 100 by an adhesive member. The adhesive member may include a typical adhesive or a typical detachable adhesive.

Figure 3B:
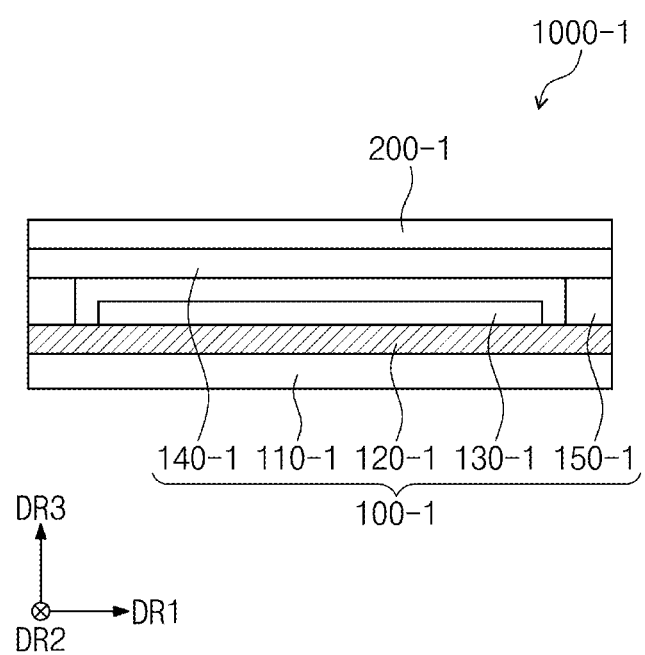
FIG. 3B is a cross-sectional view of an electronic device according to an embodiment.

FIG. 3B is a cross-sectional view of an electronic device according to an embodiment.

Referring to FIG. 3B, the electronic device 1000-1 may include a display layer 100-1 and a sensor layer 200-1. The display layer 100-1 may include a base substrate 110-1, a circuit layer 120-1, a light emitting element layer 130-1, an encapsulation substrate 140-1, and a bonding member 150-1.

Each of the base substrate 110-1 and the encapsulation substrate 140-1 may be a glass substrate, a metal substrate, or a polymer substrate but is not particularly limited thereto.

The bonding member 150-1 may be disposed between the base substrate 110-1 and the encapsulation substrate 140-1. The bonding member 150-1 may bond the encapsulation substrate 140-1 to the base substrate 110-1 or the circuit layer 120-1. The bonding member 150-1 may include an inorganic material or an organic material. For example, the inorganic material may include a frit seal, and the organic material may include photocurable resin or photoplastic resin. However, a material constituting the bonding member 150-1 is not limited to the above example.

The sensor layer 200-1 may be directly disposed on the encapsulation substrate 140-1. The expression "directly disposed" may denote that a third component is not disposed between the sensor layer 200-1 and the encapsulation substrate 140-1. That is, a separate adhesive member may not be disposed between the sensor layer 200-1 and the display layer 100-1. However, an embodiment is not limited thereto, and an adhesive layer may be further disposed between the sensor layer 200-1 and the encapsulation substrate 140-1.

Figure 4:
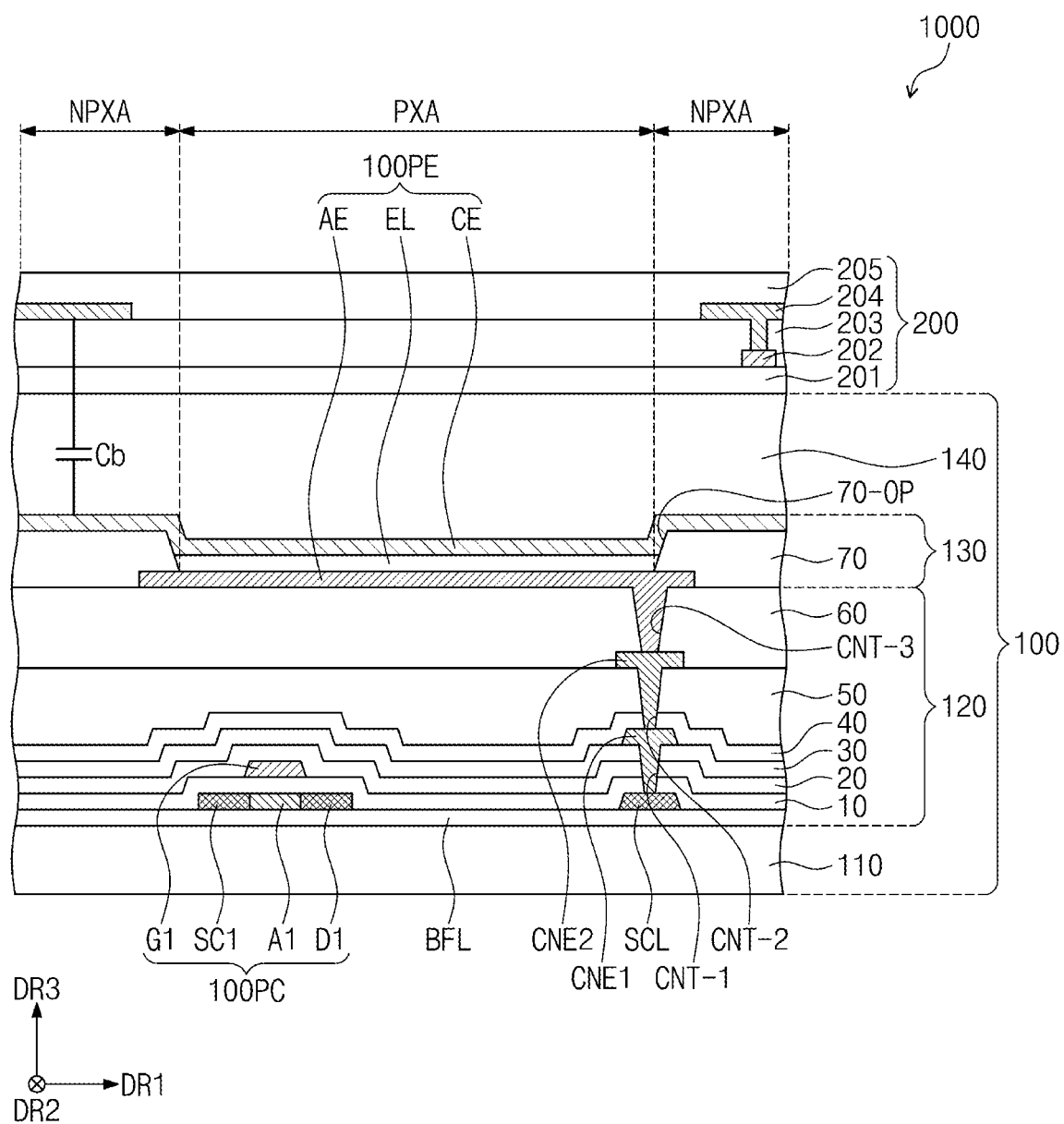
FIG. 4 is a cross-sectional view of an electronic device according to an embodiment.

FIG. 4 is a cross-sectional view of an electronic device according to an embodiment. When a description is given about FIG. 4, a component described with reference to FIG. 3A is denoted by the same reference numeral, and a description thereof will not be given for ease in explanation of the embodiment.

Referring to FIG. 4, at least one inorganic layer may be formed on a top surface of the base layer 110. The inorganic layer may include at least one of aluminum oxide, titanium oxide, silicon oxide, silicon oxynitride, zirconium oxide, or hafnium oxide. The inorganic layer may be formed in multiple inorganic layers. The multiple inorganic layers may constitute a barrier layer and/or a buffer layer. In this embodiment, the display layer 100 is illustrated to include a buffer layer BFL.

The buffer layer BFL may improve the bonding force between the base layer 110 and the semiconductor pattern. The buffer layer BFL may include a silicon oxide layer and a silicon nitride layer, and the silicon oxide layer and the silicon nitride layer may be alternately laminated.

The semiconductor pattern may be disposed on the buffer layer BFL. The semiconductor pattern may include polysilicon. However, the semiconductor pattern is not limited thereto and may include amorphous silicon, low-temperature polycrystalline silicon, or an oxide semiconductor. The semiconductor pattern may be provided as a plurality of semiconductor patterns.

FIG. 4 illustrates only some of the semiconductor patterns, and another of the semiconductor patterns may be further disposed in another area. The semiconductor patterns may be arranged in a specific rule across pixels. The semiconductor pattern may have different electrical properties depending on whether the same is doped. The semiconductor pattern may include a first region having high conductivity and a second region having low conductivity. The first region may be doped with an N-type dopant or a P-type dopant. A P-type transistor may include a doped region doped with the P-type dopant, and an N-type transistor may include a doped region doped with the N-type dopant. The second region may be a non-doped region or a region doped in a lower concentration than the first region.

The first region may have a higher conductivity than the second region and may substantially serve as an electrode or a signal line. The second region may substantially correspond to an active (or a channel) of a transistor. In other words, a portion of the semiconductor pattern may be the active of the transistor, another portion may be a source or a drain of the transistor, and another portion may be a connection electrode or a connection signal line.

Each of the pixels may have an equivalent circuit including seven transistors, one capacitor, and a light emitting element, and the equivalent circuit of the pixel may be modified into various forms. FIG. 4 exemplarily illustrates one transistor 100PC and a light emitting element 100PE included in the pixel.

The transistor 100PC may include a source SC1, an active A1, a drain D1, and a gate G1. The source SC1, the active A1, and the drain D1 may be formed from the semiconductor pattern. The source SC1 and the drain D1 may respectively extend in opposite directions from the active A1 when viewed on a cross section. FIG. 4 illustrates a portion of a connection signal line SCL formed from the semiconductor pattern. Although not illustrated separately, the connection signal line SCL may be electrically connected to the drain D1 of the is transistor 100PC when viewed in a plane.

A first insulating layer 10 may be disposed on the buffer layer BFL. The first insulating layer 10 may overlap the plurality of pixels in common and may cover the semiconductor pattern. The first insulating layer 10 may be an inorganic layer and/or an organic layer and may have a single-layer structure or a multilayer structure. The first insulating layer 10 may include at least one of aluminum oxide, titanium oxide, silicon oxide, silicon nitride, silicon oxynitride, zirconium oxide, or hafnium oxide. In this embodiment, the first insulating layer 10 may be a single-layer silicon oxide layer. In addition to the first insulating layer 10, an insulating layer of the circuit layer 120 to be described later may be an inorganic layer and/or an organic layer and may have a single-layer structure or a multilayer structure. The inorganic layer may include at least one of the above-described materials but is not limited thereto.

The gate G1 is disposed on the first insulating layer 10. The gate G1 may be a portion of a metal pattern. The gate G1 overlaps the active A1. In a process of doping the semiconductor pattern, the gate G1 may function as a mask.

A second insulating layer 20 may be disposed on the first insulating layer 10 and may cover the gate G1. The second insulating layer 20 may overlap the pixels in common. The second insulating layer 20 may be an inorganic layer and/or an organic layer and may have a single-layer structure or a multilayer structure. The second insulating layer 20 may include at least one of silicon oxide, silicon nitride, or silicon oxynitride. In this embodiment, the second insulating layer 20 may have a multilayer structure including a silicon oxide layer and a silicon nitride layer.

A third insulating layer 30 may be disposed on the second insulating layer 20. The third insulating layer 30 may have a single-layer structure or a multilayer structure. For is example, the third insulating layer 30 may have a multilayer structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 penetrating the first, second, and third insulating layers 10, 20, and 30.

A fourth insulating layer 40 may be disposed on the third insulating layer 30. The fourth insulating layer 40 may be a single-layer silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 penetrating the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer 130 may be disposed on the circuit layer 120. The light emitting element layer 130 may include the light emitting element 100PE. For example, the light emitting element layer 130 may include an organic light emitting material, a quantum dot, a quantum rod, a micro LED, or a nano LED. Hereinafter, the light emitting element 100PE is described as, as an example, an organic light emitting element but is not particularly limited thereto.

The light emitting element 100PE may include a first electrode AE, a light emitting layer EL, and a second electrode CE. The first electrode AE may be disposed on the sixth insulating layer 60. The first electrode AE may be connected to the second connection electrode CNE2 through a contact hole CNT-3 penetrating the sixth insulating layer 60.

A pixel defining film 70 may be disposed on the sixth insulating layer 60 and may cover a portion of the first electrode AE. An opening 70-OP is defined in the pixel defining film 70. The opening 70-OP of the pixel defining film 70 exposes at least a portion of the first electrode AE.

The active area 1000A (see FIG. 1A) may include a light emitting area PXA and a non-light emitting area NPXA adjacent to the light emitting area PXA. The non-light emitting area NPXA may surround the light emitting area PXA. In this embodiment, the light emitting area PXA is defined to correspond to the portion of the first electrode AE exposed by the opening 70-OP.

The light emitting layer EL may be disposed on the first electrode AE. The light emitting layer EL may be provided as a plurality of light emitting layers. The light emitting layer EL may be disposed in an area corresponding to the opening 70-OP. That is, the light emitting layers EL may be formed separately in each of the pixels. When the light emitting layers EL are formed separately in each of the pixels, each of the light emitting layers EL may emit light of at least one color of blue, red, or green. However, the light emitting layer EL is not limited thereto and may be connected to pixels and provided in common. In this case, the light emitting layer EL may provide blue light or white light.

The second electrode CE may be disposed on the light emitting layer EL. The second electrode CE may have an integral shape and may be disposed in common in the plurality is of pixels.

A hole control layer may be disposed between the first electrode AE and the light emitting layer EL. The hole control layer may be disposed in common in the light emitting area PXA and the non-light emitting area NPXA. The hole control layer may include a hole transport layer and may further include a hole injection layer. An electron control layer may be disposed between the light emitting layer EL and the second electrode CE. The electron control layer may include an electron transport layer and may further include an electron injection layer. The hole control layer and the electron control layer may be formed in common in the plurality of pixels by using an open mask.

The encapsulation layer 140 may be disposed on the light emitting element layer 130. The encapsulation layer 140 may include an inorganic layer, an organic layer, and an inorganic layer sequentially laminated, but layers constituting the encapsulation layer 140 are not limited thereto.

The inorganic layers may protect the light emitting element layer 130 from moisture and oxygen, and the organic layer may protect the light emitting element layer 130 from foreign matter such as dust particles. The inorganic layers may include a silicon nitride layer, a silicon oxynitride layer, a silicon oxide layer, a titanium oxide layer, an aluminum oxide layer, or the like. The organic layer may include an acrylate-based organic layer but is not limited thereto.

The sensor layer 200 may be formed on the display layer 100 through a continuous process. In this case, the sensor layer 200 may be said to be directly disposed on the display layer 100. The expression "directly disposed" may mean that a third component is not disposed between the sensor layer 200 and the display layer 100. That is, a separate adhesive is member may not be disposed between the sensor layer 200 and the display layer 100. Alternatively, the sensor layer 200 may be bonded to the display layer 100 by an adhesive member. The adhesive member may include a typical adhesive or a typical detachable adhesive.

The sensor layer 200 may include a base insulating layer 201, a first conductive layer 202, a sensing insulating layer 203, a second conductive layer 204, and a cover insulating layer 205.

The base insulating layer 201 may be an inorganic layer including at least one of silicon nitride, silicon oxynitride, or silicon oxide. Alternatively, the base insulating layer 201 may be an organic layer including epoxy resin, acrylic resin, or imide-based resin. The base insulating layer 201 may have a single-layer structure or a multilayer structure laminated in the third direction DR3.

Each of the first conductive layer 202 and the second conductive layer 204 may have a single-layer structure or may have a multilayer structure laminated in the third direction DR3.

A conductive layer of the single-layer structure may include a metal layer or a transparent conductive layer. The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnO), and indium zinc tin oxide (IZTO). In addition, the transparent conductive layer may include a conductive polymer such as PEDOT, metal nanowires, graphene, and the like.

A conductive layer of the multilayer structure may include metal layers. The metal layers may have, for example, a three-layer structure of titanium/aluminum/titanium. The conductive layer of the multilayer structure may include at least one metal layer and at least one transparent conductive layer.

At least one of the sensing insulating layer 203 or the cover insulating layer 205 may include an inorganic film. The inorganic film may include at least one of aluminum oxide, titanium oxide, silicon oxide, silicon nitride, silicon oxynitride, zirconium oxide, or hafnium oxide.

At least one of the sensing insulating layer 203 or the cover insulating layer 205 may include an organic film. The organic film may include at least one of acrylate-based resin, methacrylate-based resin, polyisoprene, vinyl-based resin, epoxy-based resin, urethane-based resin, cellulose-based resin, siloxane-based resin, polyimide-based resin, polyamide-based resin, or perylene-based resin.

A parasitic capacitance Cb may be generated between the sensor layer 200 and the second electrode CE. As the distance between the sensor layer 200 and the second electrode CE becomes shorter, the value of the parasitic capacitance Cb may increase. As the parasitic capacitance Cb gets higher, a ratio of an amount of change in capacitance to a reference value may decrease. The amount of change in the capacitance may refer to a change in capacitance occurring between before and after an input by an input device, for example, the input device 2000 (see FIG. 3) and the user's body 3000 (see FIG. 3) is applied.

The control unit 200C (see FIG. 2) processing a signal sensed by the sensor layer 200 may perform a leveling operation that removes a value corresponding to the parasitic capacitance Cb from the sensed signal. By the leveling operation, the ratio of the amount of change in the capacitance to the reference value may be increased, and thus sensing sensitivity may be improved.

Figure 5:
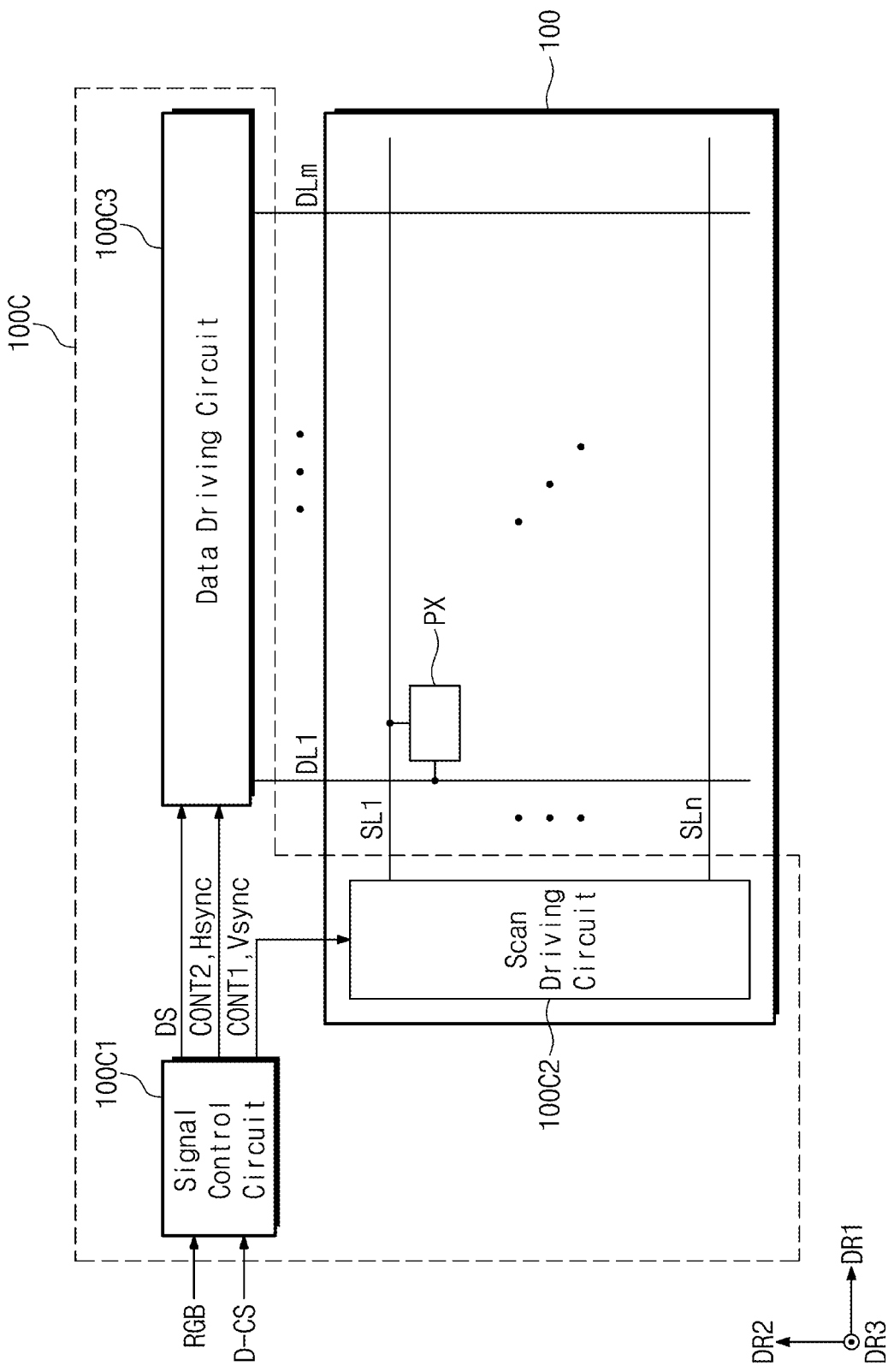
FIG. 5 is a block diagram of a display layer and a display driving unit according to an embodiment.

FIG. 5 is a block diagram of a display layer and a display driving unit according to an embodiment.

Referring to FIG. 5, the display layer 100 may include a plurality of scan lines SL1 to SLn, a plurality of data lines DL1 to DLm, and a plurality of pixels PX. Each of the plurality of pixels PX may be connected to a corresponding one of the plurality of data lines DL1 to DLm and connected to a corresponding one of the plurality of scan lines SL1 to SLn. In an embodiment, the display layer 100 may further include light emission control lines, and the display driving unit 100C may further include a light emission driving circuit that provides control signals to the light emission control lines. The configuration of the display layer 100 is not particularly limited.

The display driving unit 100C may include a signal control circuit 100C1, a scan driving circuit 100C2, and a data driving circuit 100C3.

The signal control circuit 100C1 may receive the image data RGB and the control signal D-CS from the main control unit 1000C (see FIG. 2). The control signal D-CS may include various signals. For example, the control signal D-CS may include the input vertical synchronization signal, the input horizontal synchronization signal, the main clock, the data enable signal, and the like.

The signal control circuit 100C1 may generate a first control signal CONT1 and a vertical synchronization signal Vsync on the basis of the control signal D-CS and may output the first control signal CONT1 and the vertical synchronization signal Vsync to the scan driving circuit 100C2. The vertical synchronization signal Vsync may be included in the first control signal CONT1.

The signal control circuit 100C1 may generate a second control signal CONT2 and a horizontal synchronization signal Hsync on the basis of the control signal D-CS and may is output the second control signal CONT2 and the horizontal synchronization signal Hsync to the data driving circuit 100C3. The horizontal synchronization signal Hsync may be included in the second control signal CONT2.

In addition, the signal control circuit 100C1 may output, to the data driving circuit 100C3, a data signal DS obtained by processing the image data RGB according to an operating condition of the display layer 100. The first control signal CONT1 and the second control signal CONT2 are signals needed for operations of the scan driving circuit 100C2 and the data driving circuit 100C3, respectively, and are not particularly limited.

The scan driving circuit 100C2 may drive the plurality of scan lines SL1 to SLn in response to the first control signal CONT1 and the vertical synchronization signal Vsync. In an embodiment, the scan driving circuit 100C2 may be formed in the same process as the circuit layer 120 (see FIG. 4) in the display layer 100, but the scan driving circuit 100C2 is not limited thereto. For example, the scan driving circuit 100C2 may be implemented as an integrated circuit (IC) and then may be directly mounted in a predetermined area of the display layer 100 or mounted on a separate printed circuit board in a chip on film (COF) method to be electrically connected to the display layer 100.

The data driving circuit 100C3 may output gradation voltages for driving the plurality of data lines DL1 to DLm in response to the second control signal CONT2, the horizontal synchronization signal Hsync, and the data signal DS from the signal control circuit 100C1. The data driving circuit 100C3 may be implemented as an integrated circuit and then may be directly mounted in a predetermined area of the display layer 100 or mounted on a separate printed circuit board in a chip on film method to be electrically connected to the display layer 100, but the data driving circuit 100C3 is not particularly limited. For example, the data driving circuit 100C3 may be formed in the same process as the circuit layer 120 (see FIG. 4) in the display layer 100.

Figure 6:
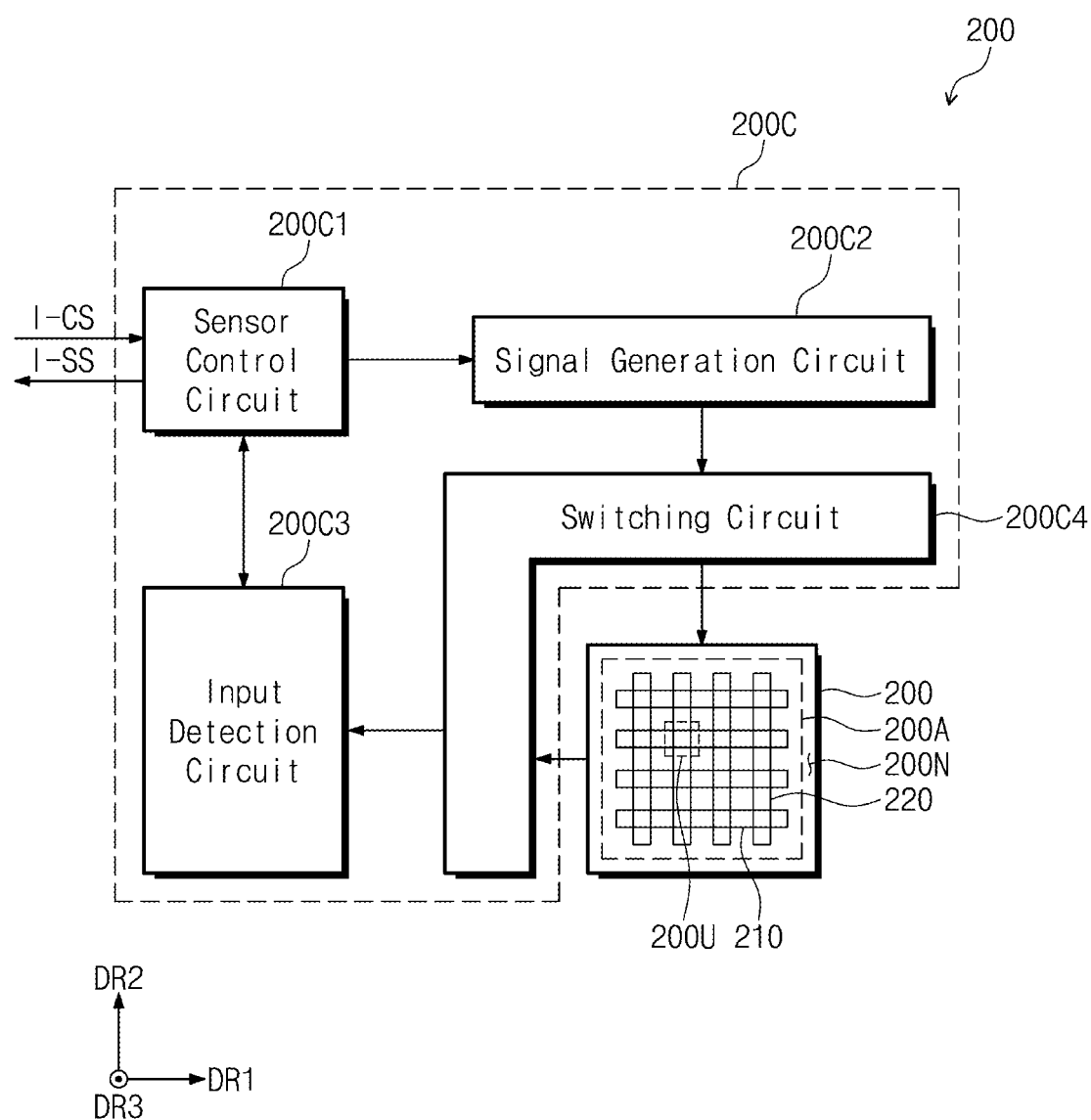
FIG. 6 is a block diagram of a sensor layer and a control unit according to an embodiment.

FIG. 6 is a block diagram of a sensor layer and a control unit according to an embodiment.

Referring to FIG. 6, an active area 200A and a peripheral area 200N may be defined in the sensor layer 200. The active area 200A may be an area that is activated according to an electrical signal. For example, the active area 200A may be an area that senses an input. The active area 200A may overlap the active area 1000A (see FIG. 1A) of the electronic device 1000 (see FIG. 1A). The peripheral area 200N may surround the active area 200A. The peripheral area 200N may overlap the peripheral area 1000NA (see FIG. 1A) of the electronic device 1000 (see FIG. 1A).

The sensor layer 200 may include a plurality of electrodes 210 and a plurality of cross electrodes 220. The plurality of electrodes 210 may each extend in the first direction DR1 and may be arranged to be spaced apart from each other in the second direction DR2. The plurality of cross electrodes 220 may each extend in the second direction DR2 and may be arranged to be spaced apart from each other in the first direction DR1.

The plurality of cross electrodes 220 may cross the plurality of electrodes 210 in an insulated manner. Each of the plurality of electrodes 210 and the plurality of cross electrodes 220 may have a bar shape or a stripe shape. The plurality of electrodes 210 and the plurality of cross electrodes 220 having such a shape may improve sensing characteristics of a continuous linear input. However, the shape of each of the plurality of electrodes 210 and the plurality of cross electrodes 220 is not limited thereto.

The control unit 200C may be electrically connected to the sensor layer 200. The control unit 200C may control the sensor layer 200. The control unit 200C may receive the control signal I-CS from the main control unit 1000C (see FIG. 2) and provide the coordinate signal I-SS to the main control unit 1000C (see FIG. 2).

The control unit 200C may include a sensor control circuit 200C1, a signal generation circuit 200C2, an input detection circuit 200C3, and a switching circuit 200C4. The sensor control circuit 200C1, the signal generation circuit 200C2, and the input detection circuit 200C3 may be implemented in a single chip, or some of the sensor control circuit 200C1, the signal generation circuit 200C2, and the input detection circuit 200C3 and the rest thereof may be respectively implemented in different chips.

The sensor control circuit 200C1 may control operations of the signal generation circuit 200C2 and the switching circuit 200C4, and may calculate coordinates of an external input from a driving signal received from the input detection circuit 200C3 or analyze, from a modulated signal received from the input detection circuit 200C3, information the input device 2000 (see FIG. 2) has transmitted. The sensor control circuit 200C1 may provide the sensor layer 200 with the first uplink signal or the second uplink signal having a phase different from that of the first uplink signal. A description thereof will be given later.

The signal generation circuit 200C2 may provide the sensor layer 200 with an output signal (or a driving signal) referred to as a TX signal. The signal generation circuit 200C2 may output an output signal corresponding to an operation mode to the sensor layer 200.

The input detection circuit 200C3 may convert, into a digital signal, an analog signal referred to as an RX signal (or a sensing signal) received from the sensor layer 200. The input detection circuit 200C3 may amplify the received analog signal and then may perform filtering on the amplified signal. Thereafter, the input detection circuit 200C3 may convert the filtered signal into the digital signal.

According to control of the sensor control circuit 200C1, the switching circuit 200C4 may selectively control an electrical connection relationship between the sensor layer 200 and the signal generation circuit 200C2 and/or between the sensor layer 200 and the input detection circuit 200C3.

The switching circuit 200C4 may connect each of the plurality of electrodes 210 and the plurality of cross electrodes 220 to the signal generation circuit 200C2. Alternatively, the switching circuit 200C4 may connect each of the plurality of electrodes 210 and the plurality of cross electrodes 220 to the input detection circuit 200C3. In this case, the sensor layer 200 may operate in the first mode.

According to the control of the sensor control circuit 200C1, the switching circuit 200C4 may connect any one group of the plurality of electrodes 210 and the plurality of cross electrodes 220 to the signal generation circuit 200C2 and may connect the other group of the plurality of electrodes 210 and the plurality of cross electrodes 220 to the input detection circuit 200C3. In this case, the sensor layer 200 may operate in the second mode.

Figure 7A:
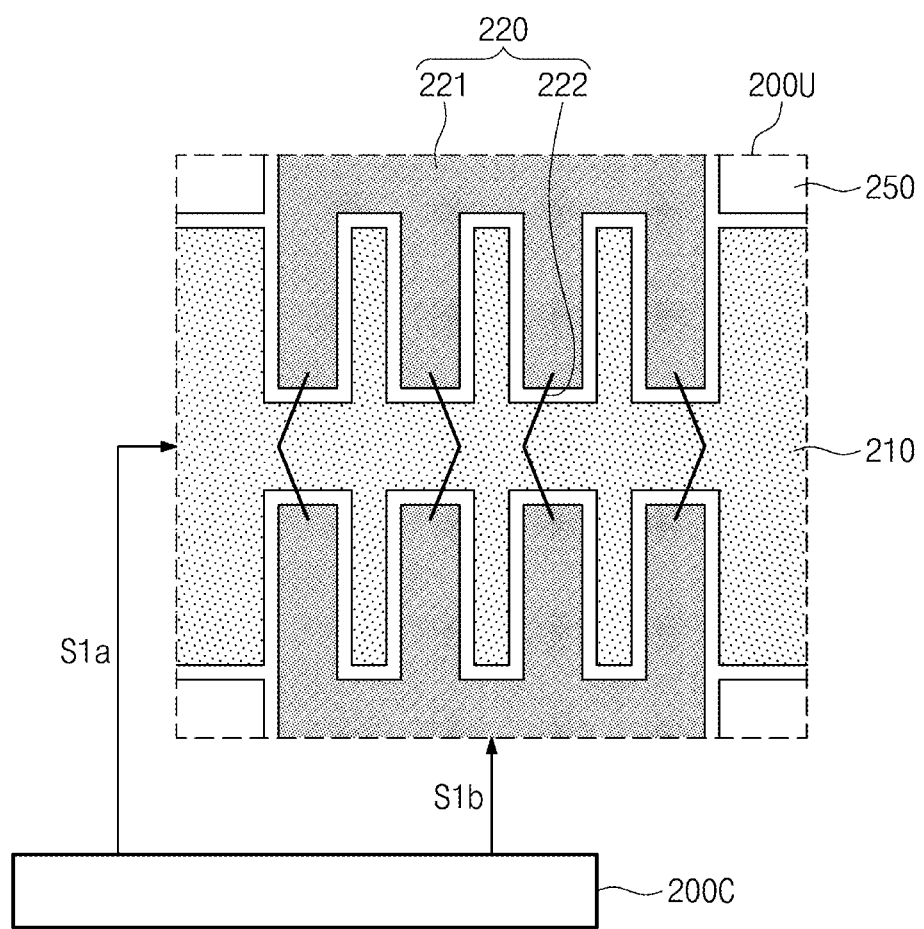
FIG. 7A illustrates a portion of a sensor layer operating in a first mode according to an embodiment.
Figure 7B:
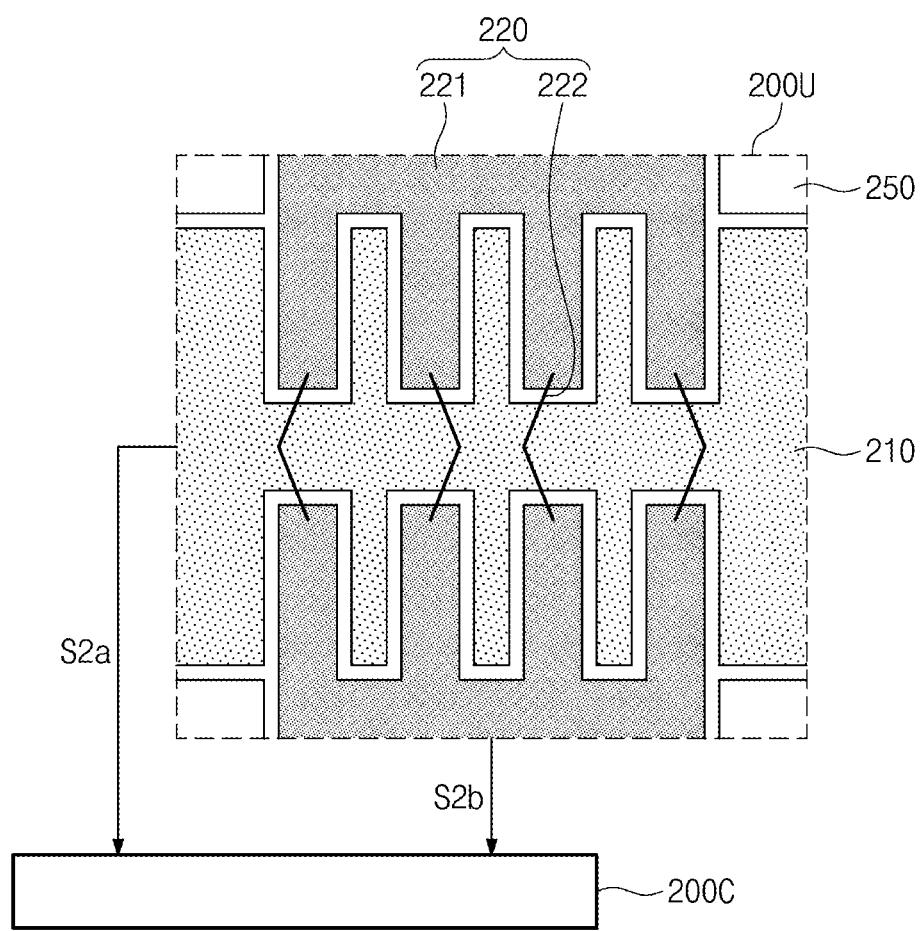
FIG. 7B illustrates a portion of a sensor layer operating in a first mode according to an embodiment.

FIG. 7A and FIG. 7B each illustrate a portion of a sensor layer operating in a first mode according to an embodiment.

Referring to FIG. 6 to FIG. 7B, a portion of one electrode 210 and a portion of one cross electrode 220 may be defined as one sensing unit 200U. In each of FIG. 7A and FIG. 7B, the one sensing unit 200U is enlarged and illustrated.

The cross electrode 220 may include cross patterns 221 and bridge patterns 222 electrically connected to the cross patterns 221. The cross patterns 221 may be spaced apart with the electrode 210 interposed therebetween. The bridge patterns 222 may overlap the electrode 210 and may cross the electrode 210 in an insulated manner.

The cross patterns 221 and the electrode 210 may be disposed in the same layer, and the bridge patterns 222 may be disposed in a layer different from the layer of the cross patterns 221 and the electrode 210. For example, the cross patterns 221 and the electrode 210 may be included in the second conductive layer 204 (see FIG. 4), and the bridge patterns 222 may be included in the first conductive layer 202 (see FIG. 4), and this structure may be referred to as a bottom bridge structure. However, the embodiment is not particularly limited thereto. For example, the cross patterns 221 and the electrode 210 may be included in the first conductive layer 202 (see FIG. 4), and the bridge patterns 222 may be included in the second conductive layer 204 (see FIG. 4), and this structure may be referred to as a top bridge structure.

In addition, the sensor layer 200 may further include a dummy pattern 250 disposed in an area where the cross patterns 221 and the electrode 210 are not disposed. The dummy pattern 250 may be a component provided to prevent the electrode 210 and the cross electrode 220 from being viewed from the outside. The dummy pattern 250 may be an electrically floating pattern.

Each of the cross patterns 221, the electrode 210, and the dummy pattern 250 may have a mesh structure. In this case, an opening may be defined in each of the cross patterns 221, the electrode 210, and the dummy pattern 250. However, an embodiment is not limited thereto, and each of the cross patterns 221, the electrode 210, and the dummy pattern 250 may be constituted of a transparent electrode without an opening.

The first mode may be a mode in which the electronic device 1000 (see FIG. 1A) and the input device 2000 (see FIG. 1A) exchange data with each other. In the first mode, the control unit 200C may detect the first input by the input device 2000 (see FIG. 2). The operation illustrated in FIG. 7A may be an operation for the electronic device 1000 (see FIG. 1A) to provide the uplink signal to the input device 2000 (see FIG. 1A).

Although, referring to FIG. 7A, the electrode 210 and the cross electrode 220 are illustrated as an example as being used as transmitting electrodes for respectively providing the input device 2000 (see FIG. 1A) with uplink signals S1a and S1b provided from the control unit 200C, the electrode 210 and the cross electrode 220 are not particularly limited thereto. For example, either the electrode 210 or the cross electrode 220 may be used as a transmitting electrode. The uplink signals S1a and S1b may be the uplink signal ULS of FIG. 2.

Referring to FIG. 7B, the electrode 210 and the cross electrode 220 may be used as receiving electrodes for respectively transmitting, to the control unit 200C, sensing signals S2a and S2b induced from the input device 2000 (see FIG. 1A). The control unit 200C may receive a first sensing signal S2a from the electrode 210 and receive a second sensing signal S2b from the cross electrode 220.

Figure 8:
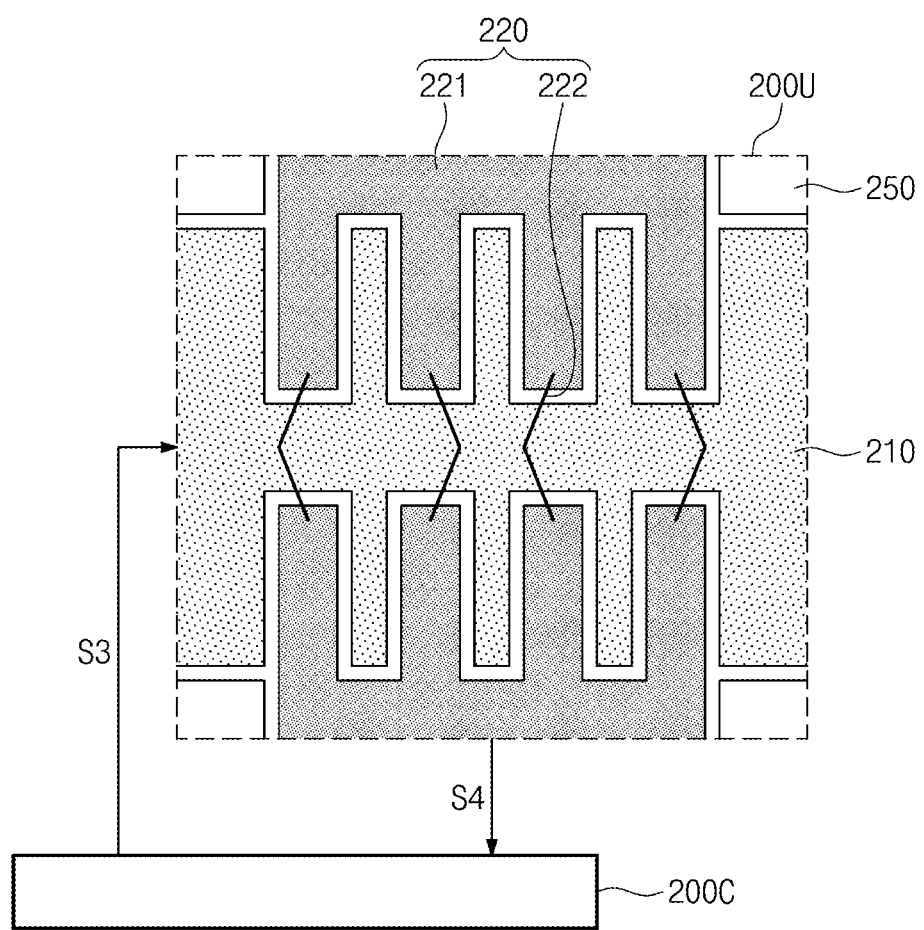
FIG. 8 illustrates a sensor layer operating in a second mode according to an embodiment.

FIG. 8 illustrates a sensor layer operating in a second mode according to an embodiment.

Referring to FIG. 6 and FIG. 8, the control unit 200C may detect the second input by the user's body 3000 (see FIG. 2) in the second mode. In the second mode, the control unit 200C may detect an external input by detecting an amount of change in mutual capacitance formed between the electrode 210 and the cross electrode 220.

The control unit 200C may provide an output signal S3 to the electrode 210 and may receive a sensing signal S4 from the cross electrode 220. That is, in the second mode, the electrode 210 may function as a transmitting electrode, and the cross electrode 220 may function as a receiving electrode. However, the electrode 210 and the cross electrode 220 are not particularly limited thereto. For example, the electrode 210 may function as a receiving electrode, and the cross electrode 220 may function as a transmitting electrode.

Figure 9:
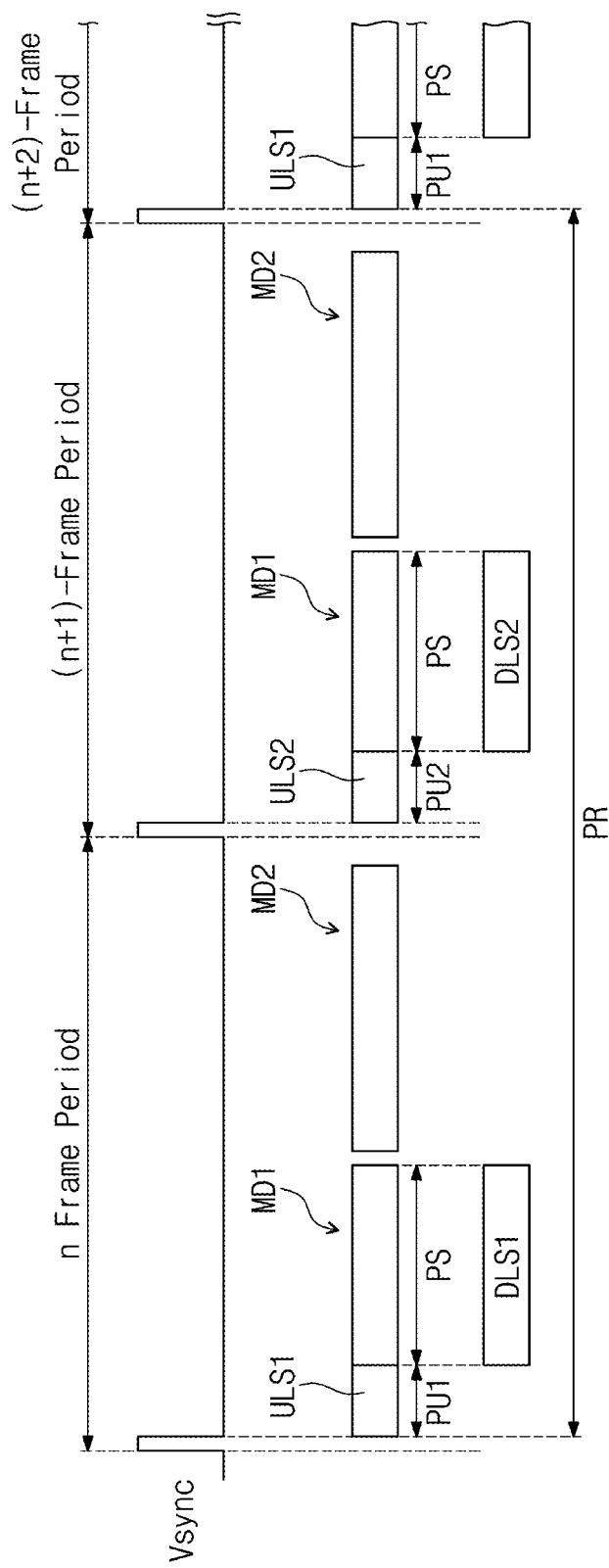
FIG. 9 is a conceptual diagram for describing an operation of a display layer and a sensor layer according to an embodiment.

FIG. 9 is a conceptual diagram for describing an operation of a display layer and a sensor layer according to an embodiment.

Referring to FIG. 2 and FIG. 9, the display layer 100 may display an image for each of frame periods. The vertical synchronization signal Vsync may be provided as a plurality of vertical synchronization signals. The frame period may be defined as a time period from a rising edge of a vertical synchronization signal Vsync to a rising edge of a next vertical synchronization signal Vsync.

When an operating frequency of the display layer 100 is about 60 Hz (Hertz), time corresponding to the frame period may be about 16.44 ms (millisecond), and when the operating frequency of the display layer 100 is about 120 Hz, time corresponding to the frame period may be about 8.33 ms. FIG. 9 exemplarily illustrates a case that the operating frequency of the display layer 100 is about 60 Hz.

The sensor layer 200 may operate in a first mode MD1 in which the first input by the input device 2000 is sensed or in a second mode MD2 in which the second input by the user's body 3000 is sensed. While an image is displayed during the frame period on the display layer 100, the control unit 200C may sequentially operate from the first mode MD1 to the second mode MD2.

During an n-th frame period (n is a positive integer), the sensor layer 200 may operate in the first mode MD1 and the second mode MD2.

The first mode MD1 may include a first time period PU1 and a second time period PS. The second time period PS may occur after the first time period PU1. In synchronization with a corresponding vertical synchronization signal Vsync, the control unit 200C may determine a start point of time of the first time period PU1. The start point of time of the first time period PU1 may be determined on the basis of a point of time of a level change of the vertical synchronization signal Vsync. For example, the start point of time of the first time period PU1 may be defined as a point of time at which the vertical synchronization signal Vsync transitions from a high level to a low level.

In the first time period PU1, the control unit 200C may output the first uplink signal ULS1 to the sensor layer 200. A frame period in which the first uplink signal ULS1 is provided may be referred to as a first frame period. A vertical synchronization signal Vsync of the frame period in which the first uplink signal ULS1 is outputted may be referred to as a first vertical synchronization signal.

In the second time period PS, the sensor layer 200 may receive a first downlink signal DLS1 provided from the input device 2000. The sensor layer 200 may sense the first input of the input device 2000 on the basis of the first downlink signal DLS1.

The input device 2000 may output the first downlink signal DLS1 on the basis of the first uplink signal ULS1. The input device 2000 may provide the downlink signal DLS1 to the control unit 200C during the second time period PS.

The second mode MD2 may occur after the first mode MD1.

During an (n+1)-th frame period, the sensor layer 200 may operate in a first mode MD1 and the second mode MD2.

The first mode MD1 may include a first time period PU2 and a second time period PS. The second time period PS may occur after the first time period PU2. In synchronization with a corresponding vertical synchronization signal Vsync, the control unit 200C may determine a start point of time of the first time period PU2. The start point of time of the first time period PU2 may be determined on the basis of a point of time of a level change of the vertical synchronization signal Vsync. For example, the start point of time of the first time period PU2 may be defined as a point of time at which the vertical synchronization signal Vsync transitions from the high level to the low level.

In the first time period PU2, the control unit 200C may output the second uplink signal ULS2 to the sensor layer 200. The second uplink signal ULS2 may have a phase different from that of the first uplink signal ULS1. A description thereof will be given later. A frame period in which the second uplink signal ULS2 is provided may be referred to as a second frame period. A vertical synchronization signal Vsync of the frame period in which the second uplink signal ULS2 is outputted may be referred to as a second vertical synchronization signal.

In the second time period PS, the sensor layer 200 may receive a second downlink signal DLS2 provided from the input device 2000. The sensor layer 200 may sense the first input of the input device 2000 on the basis of the second downlink signal DLS2.

The input device 2000 may output the second downlink signal DLS2 on the basis of the second uplink signal ULS2. The input device 2000 may provide the downlink signal DLS2 to the control unit 200C during the second time period PS.

The first frame period and the second frame period may be repeated. That is, during an (n+2)-th frame period, the control unit 200C may output the first uplink signal ULS1 to the sensor layer 200 in the first mode MD1.

The first mode MD1 and the second mode MD2 may respectively each be provided as a plurality of first modes and a plurality of second modes and may be repeated with each other. In a (2a−1)-th first mode MD1 (a is a positive integer), the control unit 200C may output the first uplink signal ULS1 to the sensor layer 200. In a 2a-th first mode MD1, the control unit 200C may output the second uplink signal ULS2 to the sensor layer 200.

In addition, the control unit 200C may output, in synchronization with a (2a−1)-th vertical synchronization signal, the first uplink signal ULS1 to the sensor layer 200 and may output, in synchronization with a 2a-th vertical synchronization signal, the second uplink signal ULS2 to the sensor layer 200.

A first period of the plurality of frame periods may be different from a second period PR according to which the first uplink signal ULS1 is outputted to the sensor layer 200. The first period may be about 16.44 ms, and the plurality of frame periods may have a frequency of about 60 Hz. The second period PR may be about 33.33 ms, and the frequency at which the first uplink signal ULS1 is outputted to the sensor layer 200 may be about 30 Hz.

Figure 10:
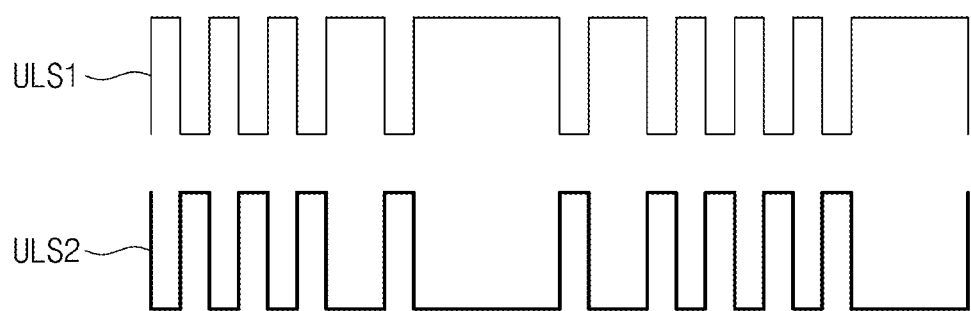
FIG. 10 illustrates a waveform of each of a first uplink signal and a second uplink signal according to an embodiment.

FIG. 10 illustrates a waveform of each of a first uplink signal and a second uplink signal according to an embodiment.

Referring to FIG. 9 and FIG. 10, the control unit 200C may output the first uplink signal ULS1 to the sensor layer 200 during the first frame period and may output the second uplink signal ULS2 to the sensor layer 200 during the second frame period.

The second uplink signal ULS2 and the first uplink signal ULS1 may have a phase difference of about 180 degrees. That is, the second uplink signal ULS2 may have a phase which is the inverse of a phase of the first uplink signal ULS1. The first uplink signal ULS1 and the second uplink signal ULS2 may be the uplink signal ULS of FIG. 2.

The first uplink signal ULS1 may be transmitted to the second electrode CE (see FIG. 4) by the parasitic capacitance Cb (see FIG. 4) formed between the sensor layer 200 and the second electrode CE (see FIG. 4). The first uplink signal ULS1 transmitted to the second electrode CE (see FIG. 4) may be transmitted to each of the plurality of data lines DL1 to DLm (see FIG. 5). Accordingly, first noise may be generated by the first uplink signal ULS1. The first noise and the data signal DS (see FIG. 5) may collide with (interfere with) each other, so that a first flicker may occur. According to an embodiment, however, the phase of the second uplink signal ULS2 may be the inverse of the phase of the first uplink signal ULS1. The second uplink signal ULS2 may be transmitted to the second electrode CE (see FIG. 4) by the parasitic capacitance Cb (see FIG. 4). The second uplink signal ULS2 transmitted to the second electrode CE (see FIG. 4) may be transmitted to each of the plurality of data lines DL1 to DLm (see FIG. 5). Second noise may be generated by the second uplink signal ULS2. The second noise and the data signal DS (see FIG. 5) may collide with (interfere with) each other, so that a second flicker may occur. The first flicker and the second flicker may be repeated for the plurality of frame periods and thus may generate an optical illusion effect that the first flicker and the second flicker cancel out each other. Accordingly, the image quality of the display layer 100 may be improved.

Figure 11:
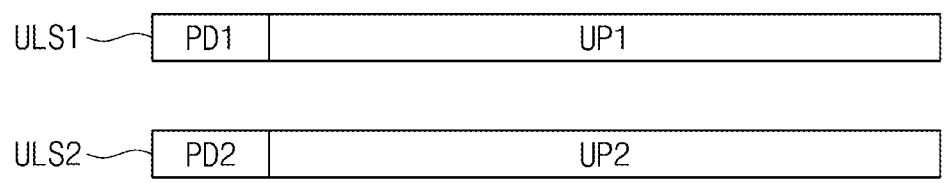
FIG. 11 schematically illustrates data of each of a first uplink signal and a second uplink signal according to an embodiment.

FIG. 11 schematically illustrates data of each of a first uplink signal and a second uplink signal according to an embodiment.

Referring to FIG. 9 and FIG. 11, each of the first uplink signal ULS1 and the second uplink signal ULS2 may have a size of 33 bits.

The first uplink signal ULS1 may include first synchronization data PD1 and first information data UP1. The second uplink signal ULS2 may include second synchronization data PD2 and second information data UP2.

The first synchronization data PD1 and the second synchronization data PD2 may each have a size of 3 bits. The first synchronization data PD1 and the second synchronization data PD2 may be different from each other. For example, the first synchronization data PD1 may have data of 001, and the second synchronization data PD2 may have data of 110.

The input device 2000 (see FIG. 2) may distinguish between the first uplink signal ULS1 and the second uplink signal ULS2 on the basis of the first synchronization data PD1 and the second synchronization data PD2.

The first information data UP1 and the second information data UP2 may each have a size of 30 bits. Each of the first information data UP1 and the second information data UP2 may include uplink information having a size of 25 bits and check information having a size of 5 bits. The uplink information may include information about the electronic device 1000 (see FIG. 2). The check information may detect an error in transmitted data. The check information may be a cyclic redundancy check (CRC).

The input device 2000 (see FIG. 2) receives the first uplink signal ULS1 and then may output the first downlink signal DLS1 on the basis of the first uplink signal ULS1. That is, the input device 2000 (see FIG. 2) may recognize the first uplink signal ULS1 on the basis of the first synchronization data PD1. The input device 2000 (see FIG. 2) may output the first downlink signal DLS1 to the sensor layer 200 (see FIG. 2) on the basis of the first information data UP1.

The input device 2000 (see FIG. 2) receives the second uplink signal ULS2 and then may output the second downlink signal DLS2 on the basis of the second uplink signal ULS2. That is, the input device 2000 (see FIG. 2) may recognize the second uplink signal ULS2 on the basis of the second synchronization data PD2. The input device 2000 (see FIG. 2) may convert the second information data UP2. For example, the input device 2000 (see FIG. 2) may convert 0 into 1 and convert 1 into 0 for the second uplink signal ULS2 when having recognized the second synchronization data PD2.

According to an embodiment, the input device 2000 (see FIG. 2) may convert the phase of the second information data UP2 when having recognized the second uplink signal ULS2. The input device 2000 (see FIG. 2) may output the second downlink signal DLS2 on the basis of the converted second information data. The electronic device 1000 (see FIG. 2) may detect coordinates or a tilt of the input device 2000 (see FIG. 2) on the basis of the first downlink signal DLS1 and the second downlink signal DLS2 received from the input device 2000 (see FIG. 2). Accordingly, the input device 2000 (see FIG. 2) receives either of the first uplink signal ULS1 and the second uplink signal ULS2 received in each of the plurality of frame periods and then may output the downlink signal DLS (see FIG. 2) to the sensor layer 200 (see FIG. 2). Accordingly, sensing reliability of the sensor layer 200 (see FIG. 2) may be improved.

Figure 12:
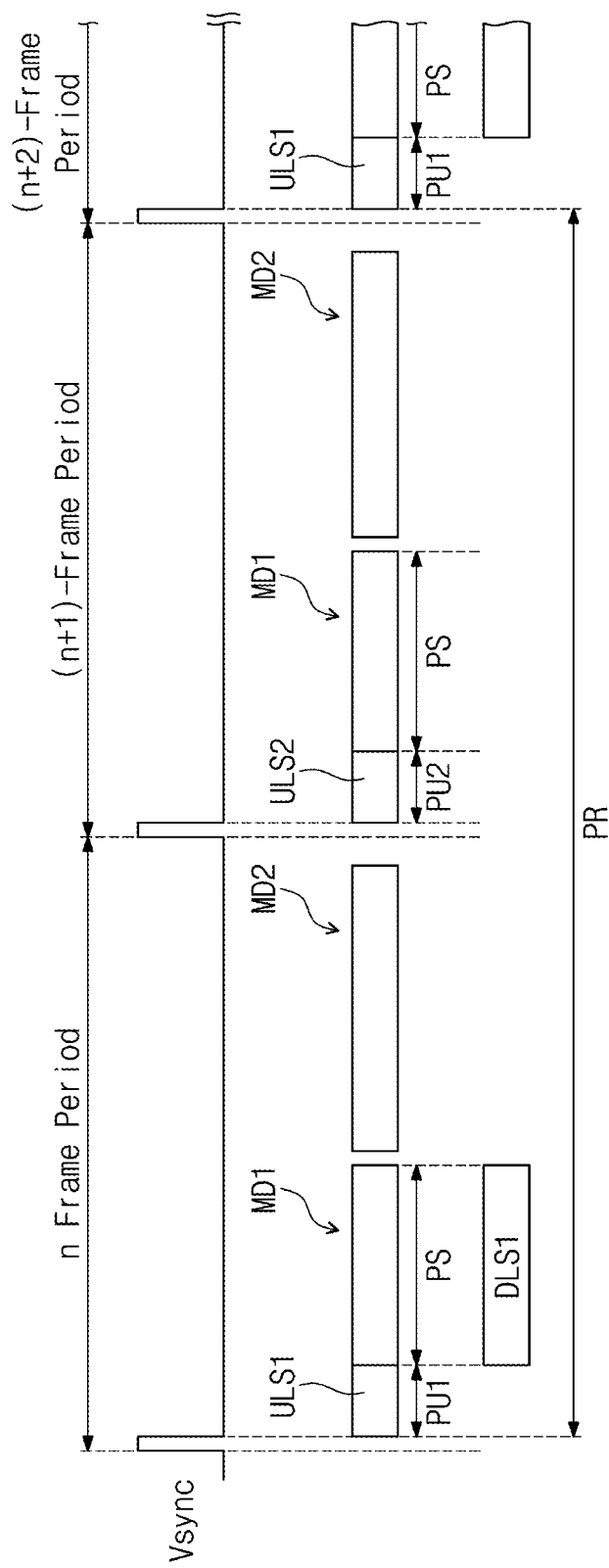
FIG. 12 is a conceptual diagram for describing an operation of a display layer and a sensor layer according to an embodiment.

FIG. 12 is a conceptual diagram for describing an operation of a display layer and a sensor layer according to an embodiment. When a description is given about FIG. 12, a component described with reference to FIG. 9 is denoted by the same reference numeral, and a description thereof will not be given for ease in explanation of the embodiment.

Referring to FIG. 2 and FIG. 12, an input device 2000 may receive a first uplink signal ULS1 and a second uplink signal ULS2. The input device 2000 may output a first downlink signal DLS1 to a sensor layer 200 on the basis of only the first uplink signal ULS1.

A first period of a plurality of frame periods may be different from a second period PR according to which the first uplink signal ULS1 is outputted to the sensor layer 200. The first period may be about 16.44 ms, and the plurality of frame periods may have a frequency of about 60 Hz. The second period PR may be about 33.33 ms, and the frequency at which the first uplink signal ULS1 is outputted to the sensor layer 200 may be about 30 Hz. That is, the sensor layer 200 may receive the first downlink signal DLS1 from the input device 2000 according to the second period PR.

An electronic device 1000 (see FIG. 2) may detect coordinates or a tilt of the input device 2000 (see FIG. 2) on the basis of the first downlink signal DLS1 received from the input device 2000 (see FIG. 2).

The first uplink signal ULS1 may be transmitted to a second electrode CE (see FIG. 4) by a parasitic capacitance Cb (see FIG. 4) formed between the sensor layer 200 and the second electrode CE (see FIG. 4). The first uplink signal ULS1 transmitted to the second electrode CE (see FIG. 4) may be transmitted to each of a plurality of data lines DL1 to DLm (see FIG. 5). Accordingly, first noise may be generated by the first uplink signal ULS1. The first noise and a data signal DS (see FIG. 5) may collide with (interfere with) each other, so that a first flicker may occur. According to an embodiment, however, the phase of the second uplink signal ULS2 may be the inverse of the phase of the first uplink signal ULS1. The second uplink signal ULS2 may be transmitted to the second electrode CE (see FIG. 4) by the parasitic capacitance Cb (see FIG. 4). The second uplink signal ULS2 transmitted to the second electrode CE (see FIG. 4) may be transmitted to each of the plurality of data lines DL1 to DLm (see FIG. 5). Second noise may be generated by the second uplink signal ULS2. The second noise and the data signal DS (see FIG. 5) may collide with (interfere with) each other, so that a second flicker may occur. The first flicker and the second flicker may be repeated for the plurality of frame periods and thus may generate an optical illusion effect that the first flicker and the second flicker cancel out each other. Accordingly, the image quality of a display layer 100 may be improved.

Figure 13:
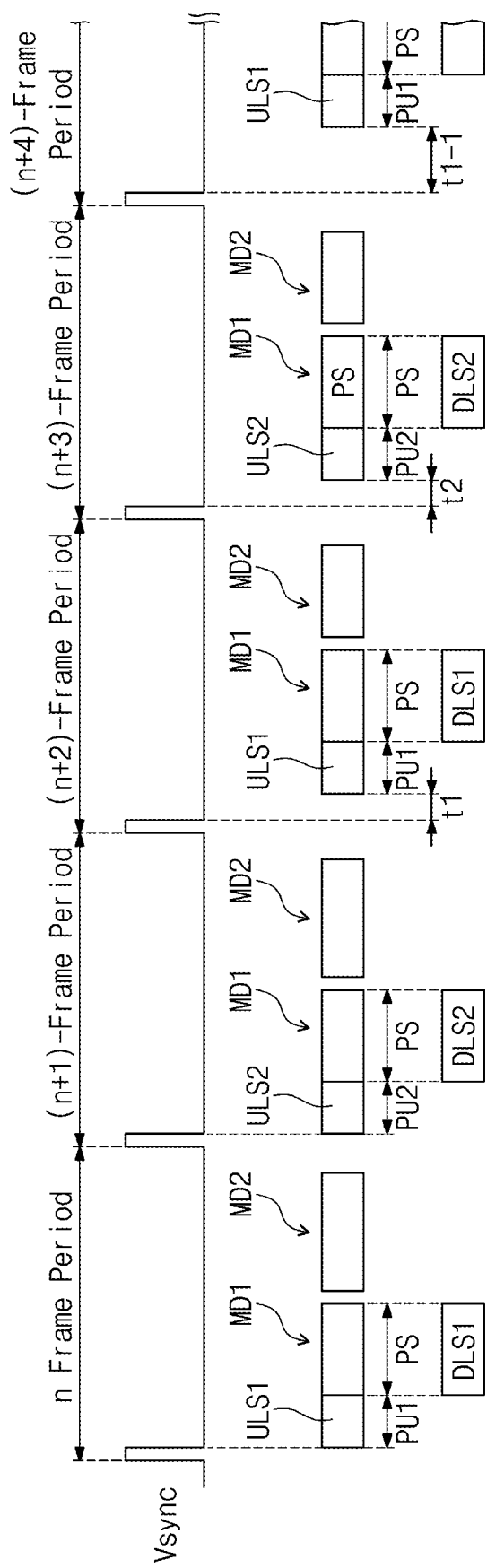
FIG. 13 is a conceptual diagram for describing an operation of a display layer and a sensor layer according to an embodiment.

FIG. 13 is a conceptual diagram for describing an operation of a display layer and is a sensor layer according to an embodiment. When a description is given about FIG. 13, a component described with reference to FIG. 9 is denoted by the same reference numeral, and a description thereof will not be given for ease in explanation of the embodiment.

Referring to FIG. 2 and FIG. 13, a sensor layer 200 may operate in a first mode MD1 and a second mode MD2 during each of a plurality of frame periods. A first uplink signal ULS1 (see FIG. 9), a second uplink signal ULS2 (see FIG. 9), and a vertical synchronization signal Vsync may each be provided as a plurality of first uplink signals, a plurality of second uplink signals, and a plurality of vertical synchronization signals, respectively.

An output timing of a first uplink signal ULS1 provided to the sensor layer 200 in synchronization with an (n+2)-th vertical synchronization signal in an (n+2)-th frame period (n is a positive integer) may be delayed by a first time t1 when compared with an output timing of a first uplink signal ULS1 provided to the sensor layer 200 in synchronization with an n-th vertical synchronization signal in an n-th frame period.

An output timing of a first uplink signal ULS1 provided to the sensor layer 200 in synchronization with an (n+4)-th vertical synchronization signal in an (n+4)-th frame period may be delayed by a predetermined time when compared with the output timing of the first uplink signal ULS1 provided to the sensor layer 200 in the (n+2)-th frame period, and may be delayed by a second time t1-1 when compared with the output timing of the first uplink signal ULS1 provided to the sensor layer 200 in synchronization with the n-th vertical synchronization signal in the n-th frame period.

An output timing of a second uplink signal ULS2 provided to the sensor layer 200 in synchronization with an (n+3)-th vertical synchronization signal in an (n+3)-th frame period may be delayed by a third time t2 when compared with an output timing of a second uplink is signal ULS2 provided to the sensor layer 200 in synchronization with an (n+1)-th vertical synchronization signal in an (n+1)-th frame period. The third time t2 may be substantially equal to the first time t1.

According to an embodiment of, first noise may be generated by the first uplink signal ULS1 outputted during the n-th frame period. The first noise and a data signal DS (see FIG. 5) may collide with (interfere with) each other, so that a first flicker may occur. The first flicker may be outputted to a first area of an active area 1000A (see FIG. 1A). Second noise may be generated by the second uplink signal ULS2 outputted during the (n+1)-th frame period. The second noise and the data signal DS (see FIG. 5) may collide with (interfere with) each other, so that a second flicker may occur. The first flicker and the second flicker may generate an optical illusion effect that the first flicker and the second flicker cancel out each other. Accordingly, the image quality of a display layer 100 may be improved.

In addition, third noise may be generated by the first uplink signal ULS1 outputted during the (n+2)-th frame period. The third noise and the data signal DS (see FIG. 5) may collide with (interfere with) each other, so that a third flicker may occur. The third flicker may be outputted to a second area, different from the first area, of the active area 1000A (see FIG. 1A). Fourth noise may be generated by the second uplink signal ULS2 outputted during the (n+3)-th frame period. The fourth noise and the data signal DS (see FIG. 5) may collide with (interfere with) each other, so that a fourth flicker may occur. The third flicker and the fourth flicker may generate an optical illusion effect that the third flicker and the fourth flicker cancel out each other. Accordingly, the image quality of the display layer 100 may be improved.

According to an embodiment, an output timing of the third flicker occurring during the (n+2)-th frame period may be delayed by the predetermined time t1 when compared is with an output timing of the first flicker occurring during the n-th frame period, and an output timing of the fourth flicker occurring during the (n+3)-th frame period may be delayed by the predetermined time t2 when compared with an output timing of the second flicker occurring during the (n+1)-th frame period. That is, an effect that the flickers are canceled out in the first area may occur during the n-th frame period and the (n+1)-th frame period of an electronic device 1000 (see FIG. 1A), and an effect that the flickers are canceled out in the second area may occur during the (n+2)-th frame period and the (n+3)-th frame period. There may occur an optical illusion effect that the flickers generated by an uplink signal ULS are canceled out in different areas of the active area 1000A (see FIG. 1A). Accordingly, it may be possible to prevent flickers continually occurring in the same area of the active area 1000A (see FIG. 1A) from being viewed from the outside.

Figure 14:
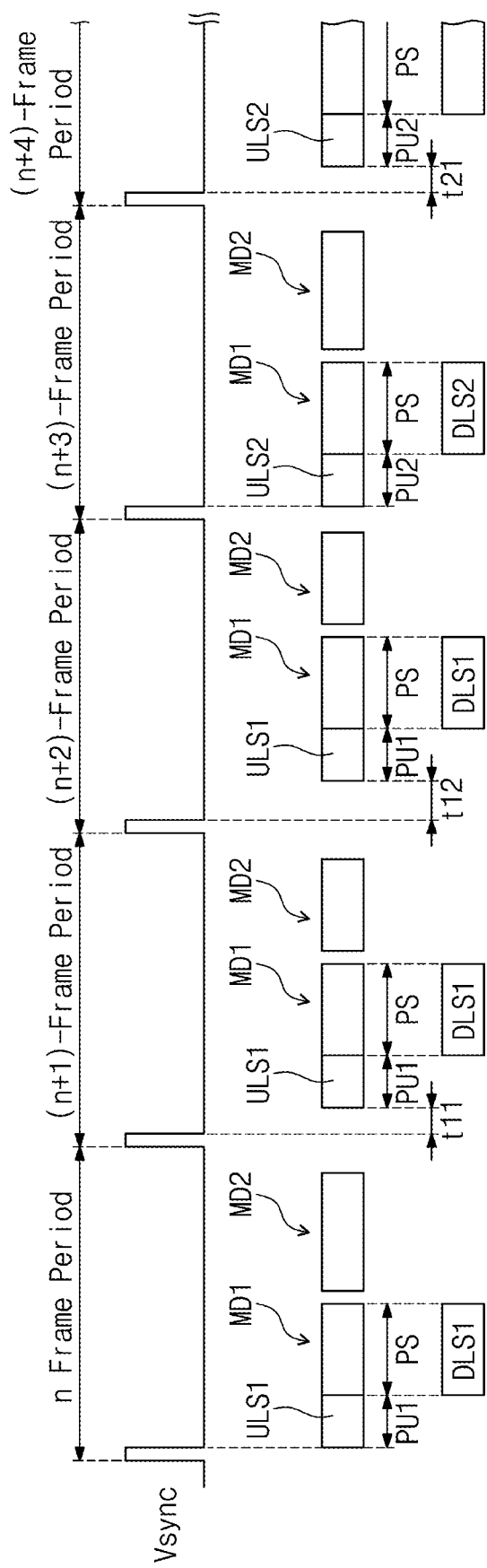
FIG. 14 is a conceptual diagram for describing an operation of a display layer and a sensor layer according to an embodiment.

FIG. 14 is a conceptual diagram for describing an operation of a display layer and a sensor layer according to an embodiment. When a description is given about FIG. 14, components described with reference to FIG. 9 are denoted by the same reference numerals, and a description thereof will not be given for ease in explanation of the embodiment.

Referring to FIG. 2 and FIG. 14, during each of a plurality of frame periods, a sensor layer 200 may operate in a first mode MD1 and a second mode MD2. A first uplink signal ULS1 (see FIG. 9), a second uplink signal ULS2 (see FIG. 9), and a vertical synchronization signal Vsync may each be provided as a plurality of vertical synchronization signals.

The sensor layer 200 may continually provide the first uplink signals ULS1 for m number of frame periods (m is an integer greater than 1), respectively. In the example shown in FIG. 14, the first uplink signals ULS1 are illustrated as being continually provided for three frame periods, respectively.

An output timing of a first uplink signal ULS1 outputted to the sensor layer 200 in synchronization with an (n+1)-th vertical synchronization signal (n is a positive integer) in an (n+1)-th frame period may be delayed by a first time t11 when compared with an output timing of a first uplink signal ULS1 outputted to the sensor layer 200 in synchronization with an n-th vertical synchronization signal in an n-th frame period.

An output timing of a first uplink signal ULS1 outputted to the sensor layer 200 in synchronization with an (n+2)-th vertical synchronization signal in an (n+2)-th frame period may be delayed by a predetermined time when compared with the output timing of the first uplink signal ULS1 outputted to the sensor layer 200 in synchronization with the (n+1)-th vertical synchronization signal, and may be delayed by a second time t12 when compared with the output timing of the first uplink signal ULS1 outputted to the sensor layer 200 in synchronization with the n-th vertical synchronization signal in the n-th frame period.

The sensor layer 200 may continually provide the second uplink signals ULS2 for k number of frame periods (k is an integer greater than 1), respectively.

An output timing of a second uplink signal ULS2 outputted to the sensor layer 200 in synchronization with an (n+4)-th vertical synchronization signal in an (n+4)-th frame period may be delayed by a third time t21 when compared with an output timing of a second uplink signal ULS2 outputted to the sensor layer 200 in synchronization with an (n+3)-th vertical synchronization signal in an (n+3)-th frame period. The third time t21 may be substantially equal to the first time t11.

According to an embodiment, first noise may be generated by the first uplink signal ULS1 outputted during the n-th frame period. The first noise and a data signal DS (see is FIG. 5) may collide with (interfere with) each other, so that a first flicker may occur. The first flicker may be outputted to a first area of an active area 1000A (see FIG. 1A). Second noise may be generated by the second uplink signal ULS2 outputted during the (n+3)-th frame period. The second noise and the data signal DS (see FIG. 5) may collide with (interfere with) each other, so that a second flicker may occur. The first flicker and the second flicker may generate an optical illusion effect that the first flicker and the second flicker cancel out each other. Accordingly, the image quality of a display layer 100 may be improved.

In addition, third noise may be generated by the first uplink signal ULS1 outputted during the (n+1)th frame period. The third noise and the data signal DS (see FIG. 5) may collide with (interfere with) each other, so that a third flicker may occur. The third flicker may be outputted to a second area, different from the first area, of the active area 1000A (see FIG. 1A). Fourth noise may be generated by the second uplink signal ULS2 outputted during the (n+4)-th frame period. The fourth noise and the data signal DS (see FIG. 5) may collide with (interfere with) each other, so that a fourth flicker may occur. The third flicker and the fourth flicker may generate an optical illusion effect that the third flicker and the fourth flicker cancel out each other. Accordingly, the image quality of the display layer 100 may be improved.

According to an embodiment, an output timing of the third flicker occurring during the (n+1)-th frame period may be delayed by the predetermined time t11 when compared with an output timing of the first flicker occurring during the n-th frame period, and an output timing of the fourth flicker occurring during the (n+4)-th frame period may be delayed by the predetermined time t21 when compared with an output timing of the second flicker occurring during the (n+3)-th frame period. That is, an optical illusion effect that the flickers are canceled out in the first area may occur during the n-th frame period and the (n+3)-th frame period of an is electronic device 1000 (see FIG. 1A), and an optical illusion effect that the flickers are canceled out in the second area may occur during the (n+1)-th frame period and the (n+4)-th frame period. There may occur an optical illusion effect that the flickers generated by an uplink signal ULS are canceled out in different areas of the active area 1000A (see FIG. 1A). Accordingly, it may be possible to prevent flickers continually occurring in the same area of the active area 1000A (see FIG. 1A) from being viewed from the outside.

According to an embodiment, the first uplink signal may be outputted to the sensor layer during the first frame period. During the second frame period, the second uplink signal having a phase different from that of the first uplink signal may be outputted to the sensor layer. The first flicker generated in an image by the first uplink signal and the second flicker generated in the image by the second uplink signal may be repeated for the plurality of frame periods, thereby generating an optical illusion effect that the first flicker and the second flicker cancel out each other. Accordingly, the image quality of the electronic device may be improved.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An electronic device comprising:
a display layer configured to display an image for a plurality of frame periods;
a sensor layer disposed on the display layer and configured to operate in a first mode in which a first input by an input device is sensed and in a second mode in which a second input by a touch is sensed; and
a control unit configured to control the sensor layer,
wherein the control unit outputs, to the sensor layer during a first frame period of the plurality of frame periods, a first uplink signal in the first mode and outputs, to the sensor layer during a second frame period of the plurality of frame periods different from the first frame period, a second uplink signal having a phase different from a phase of the first uplink signal in the first mode,
wherein the first uplink signal and the second uplink signal are each respectively provided as a plurality of first uplink signals and a plurality of second uplink signals, and an output timing of a first uplink signal in an (n+2)-th frame period, in which n is a positive integer, is delayed by a first time when compared with an output timing of a first uplink signal in an n-th frame period.

2. The electronic device of claim 1, wherein the first uplink signal and the second uplink signal respectively comprise synchronization data different from each other.

3. The electronic device of claim 1, wherein
the first mode and the second mode are each respectively provided as a plurality of first modes and a plurality of second modes and are repeated with each other, and
the control unit outputs the first uplink signal to the sensor layer in a (2n−1)-th first mode, in which n is a positive integer, and outputs the second uplink signal to the sensor layer in a 2n-th first mode.

4. The electronic device of claim 1, wherein an output timing of a second uplink signal in an (n+3)-th frame period is delayed by a second time when compared with an output timing of a second uplink signal in an (n+1)-th frame period.

5. The electronic device of claim 1, wherein the first uplink signal and the second uplink signal are each respectively provided as a plurality of first uplink signals and a plurality of second uplink signals, and the control unit continually outputs the first uplink signals to the sensor layer for m number of frame periods, in which m is an integer greater than 1, respectively, and continually outputs the second uplink signals to the sensor layer for k number of frame periods, in which k is an integer greater than 1, respectively.

6. The electronic device of claim 5, wherein
an output timing of a first uplink signal in an (n+1)-th frame period, in which n is a positive integer, is delayed by a first time when compared with an output timing of a first uplink signal in an n-th frame period, and
an output timing of a second uplink signal in an (i+1)-th frame period, in which i is a positive integer, is delayed by a second time different from the first time when compared with an output timing of a second uplink signal in an i-th frame period.

7. The electronic device of claim 1, wherein a first period of the plurality of frame periods is different from a second period of the first uplink signal.

8. The electronic device of claim 1, wherein the control unit sequentially operates in the first mode and the second mode while an image of one frame period is displayed on the display layer.

9. The electronic device of claim 1, wherein the first mode comprises a first time period in which the first uplink signal or the second uplink signal is transmitted to the input device, and a second time period in which the first input is sensed from a downlink signal provided from the input device, and
wherein the second time period occurs after the first time period.

10. The electronic device of claim 1, further comprising a display driving unit configured to generate a vertical synchronization signal for driving the display layer, and
wherein the control unit outputs, in synchronization with the vertical synchronization signal, the first uplink signal or the second uplink signal to the sensor layer.

11. An interface device comprising an electronic device and an input device configured to communicate with the electronic device,
wherein the electronic device comprises:
a display layer;
a sensor layer disposed on the display layer and configured to sense a first input by the input device;
a display driving unit configured to generate a synchronization signal for driving the display layer; and
a control unit configured to control the sensor layer,
wherein the control unit outputs, to the sensor layer in synchronization with a first synchronization signal, a first uplink signal, and outputs, to the sensor layer in synchronization with a second synchronization signal different from the first synchronization signal, a second uplink signal having a phase different from a phase of the first uplink signal,
wherein the synchronization signal is a vertical synchronization signal, wherein the vertical synchronization signal is provided as a plurality of vertical synchronization signals respectively provided for a plurality of frames, and the control unit outputs, to the sensor layer in synchronization with a (2n−1)-th vertical synchronization signal, in which n is a positive integer, the first uplink signal, and outputs, to the sensor layer in synchronization with a 2n-th vertical synchronization signal, the second uplink signal.

12. The interface device of claim 11, wherein
the first uplink signal comprises first synchronization data, and the second uplink signal comprises second synchronization data, and
the input device distinguishes between the first uplink signal and the second uplink signal based upon the first synchronization data and the second synchronization data.

13. The interface device of claim 11, wherein the input device is configured to receive the first uplink signal and the second uplink signal, output a first downlink signal based upon the first uplink signal, and output a second downlink signal based upon the second uplink signal.

14. The interface device of claim 11, wherein the input device is configured to receive the first uplink signal and the second uplink signal and output a downlink signal based only upon the first uplink signal.

15. The interface device of claim 11, wherein the first uplink signal, the second uplink signal, and the synchronization signal are each respectively provided as a plurality of first uplink signals, a plurality of second uplink signals, and a plurality of synchronization signals, and an output timing of a first uplink signal outputted to the sensor layer in synchronization with an (n+2)-th synchronization signal, in which n is a positive integer, is delayed by a first time when compared with an output timing of a first uplink signal outputted to the sensor layer in synchronization with an n-th synchronization signal.

16. An interface device comprising an electronic device and an input device configured to communicate with the electronic device,
wherein the electronic device comprises:
a display layer;
a sensor layer disposed on the display layer and configured to sense a first input by the input device;
a display driving unit configured to generate a synchronization signal for driving the display layer; and
a control unit configured to control the sensor layer,
wherein the control unit outputs, to the sensor layer in synchronization with a first synchronization signal, a first uplink signal, and outputs, to the sensor layer in synchronization with a second synchronization signal different from the first synchronization signal, a second uplink signal having a phase different from a phase of the first uplink signal,
wherein the first uplink signal, the second uplink signal, and the synchronization signal are each respectively provided as a plurality of first uplink signals, a plurality of second uplink signals, and a plurality of synchronization signals, and an output timing of a first uplink signal outputted to the sensor layer in synchronization with an (n+2)-th synchronization signal, in which n is a positive integer, is delayed by a first time when compared with an output timing of a first uplink signal outputted to the sensor layer in synchronization with an n-th synchronization signal, and
wherein an output timing of a second uplink signal outputted to the sensor layer in synchronization with an (n+3)-th synchronization signal is delayed by a second time when compared with an output timing of a second uplink signal outputted to the sensor layer in synchronization with an (n+1)-th synchronization signal.

17. The interface device of claim 11, wherein the first uplink signal, the second uplink signal, and the synchronization signal are respectively each provided as a plurality of first uplink signals, a plurality of second uplink signals, and a plurality of synchronization signals respectively provided for a plurality of frames, and the control unit continually outputs the first uplink signals to the sensor layer for m number of frame periods, in which m is an integer greater than 1, respectively, and continually outputs the second uplink signals to the sensor layer for k number of frame periods, in which k is an integer greater than 1, respectively.

18. The interface device of claim 17, wherein
an output timing of a first uplink signal outputted to the sensor layer in synchronization with an (n+1)-th synchronization signal, in which n is a positive integer, is delayed by a first time when compared with an output timing of a first uplink signal outputted to the sensor layer in synchronization with an n-th synchronization signal, and
an output timing of a second uplink signal outputted to the sensor layer in synchronization with an (i+1)-th synchronization signal, in which i is a positive integer, is delayed by a second time different from the first time when compared with an output timing of a second uplink signal outputted to the sensor layer in synchronization with an i-th synchronization signal.

* * * * *